(12) United States Patent
Uesaka et al.

(10) Patent No.: US 10,906,082 B2
(45) Date of Patent: Feb. 2, 2021

(54) LAMINATED CORE MANUFACTURING APPARATUS AND LAMINATED CORE MANUFACTURING METHOD

(71) Applicant: JFE STEEL CORPORATION, Tokyo (JP)

(72) Inventors: Masanori Uesaka, Tokyo (JP); Kunihiro Senda, Tokyo (JP); Yoshihiko Oda, Tokyo (JP); Yoshihide Kamitani, Nagoya (JP); Yasuhito Shioiri, Chiba (JP)

(73) Assignee: JFE Steel Corporation, Tokyo (JP)

( * ) Notice: Subject to any disclaimer, the term of this patent is extended or adjusted under 35 U.S.C. 154(b) by 252 days.

(21) Appl. No.: 15/757,088

(22) PCT Filed: Aug. 22, 2016

(86) PCT No.: PCT/JP2016/074341
§ 371 (c)(1),
(2) Date: Mar. 2, 2018

(87) PCT Pub. No.: WO2017/038522
PCT Pub. Date: Mar. 9, 2017

(65) Prior Publication Data
US 2018/0178267 A1 Jun. 28, 2018

(30) Foreign Application Priority Data
Sep. 4, 2015 (JP) .................. 2015-174695

(51) Int. Cl.
*B21D 28/14* (2006.01)
*H02K 15/02* (2006.01)
(Continued)

(52) U.S. Cl.
CPC ............. *B21D 28/14* (2013.01); *B21D 28/04* (2013.01); *B21D 35/007* (2013.01);
(Continued)

(58) Field of Classification Search
CPC ......... B23P 19/00; B23P 19/008; B23P 19/04; B23P 21/00; B23P 21/004; B23P 21/06;
(Continued)

(56) References Cited

U.S. PATENT DOCUMENTS

| 5,613,390 A | 3/1997 | Ishikawa et al. |
| 6,290,170 B1 | 9/2001 | Suzuki et al. |

(Continued)

FOREIGN PATENT DOCUMENTS

| CN | 202779203 U | 3/2013 |
| CN | 203792916 U | 8/2014 |

(Continued)

OTHER PUBLICATIONS

International Search Report and Written Opinion for International Application No. PCT/JP2016/074341, dated Sep. 27, 2016, 4 Pages.
(Continued)

*Primary Examiner* — Carl J Arbes
(74) *Attorney, Agent, or Firm* — RatnerPrestia

(57) ABSTRACT

A Laminated core manufacturing device includes: an overlapping unit configured to overlap the plurality of laminated core materials conveyed along different conveyance routes; an edge aligning unit configured to align edge positions in a width direction of the plurality of laminated core materials between the plurality of laminated core materials; an uplift prevention unit configured to prevent uplift of the plurality of laminated core materials; an edge position correction unit configured to correct the edge positions in the width direction of the plurality of laminated core materials; and a punching unit configured to punch out the plurality of laminated core materials which are overlapped by the overlapping unit and have been subjected to an edge position alignment process performed by the edge aligning unit, an uplift prevention process performed by the uplift prevention
(Continued)

unit, and an edge position correction process performed by the edge position correction unit.

6 Claims, 7 Drawing Sheets

(51) Int. Cl.

| | | |
|---|---|---|
| *H01F 41/02* | (2006.01) | |
| *B30B 15/30* | (2006.01) | |
| *B26D 7/06* | (2006.01) | |
| *B21D 28/04* | (2006.01) | |
| *B21D 35/00* | (2006.01) | |
| *B21D 43/02* | (2006.01) | |
| *B21D 43/09* | (2006.01) | |
| *B21D 43/00* | (2006.01) | |

(52) U.S. Cl.
CPC ........... *B21D 43/023* (2013.01); *B21D 43/09* (2013.01); *B26D 7/06* (2013.01); *B26D 7/0625* (2013.01); *B30B 15/30* (2013.01); *H01F 41/02* (2013.01); *H01F 41/0233* (2013.01); *H02K 15/02* (2013.01); *H02K 15/026* (2013.01); *B21D 43/003* (2013.01); *B30B 15/306* (2013.01); *H01F 41/0266* (2013.01)

(58) Field of Classification Search
CPC ........... B29C 63/16; B30B 5/02; B30B 15/30; B30B 15/306; B32B 37/10; B21D 28/04; B21D 28/14; B21D 35/007; B21D 43/003; B21D 43/023; B21D 43/09; B26D 7/06; B26D 7/0625; H02R 15/02; H02R 15/026
See application file for complete search history.

(56) References Cited

U.S. PATENT DOCUMENTS

| | | |
|---|---|---|
| 2012/0047718 A1 | 3/2012 | Ikeda et al. |
| 2013/0180308 A1 | 7/2013 | Breen et al. |

FOREIGN PATENT DOCUMENTS

| | | | |
|---|---|---|---|
| CN | 204321011 | U | 5/2015 |
| EP | 1043086 | A2 | 10/2000 |
| EP | 1398137 | B1 * | 11/2012 |
| GB | 913725 | A | 12/1962 |
| JP | 6015412 | U | 2/1985 |
| JP | 6313846 | Y2 | 4/1988 |
| JP | 10193009 | A | 7/1998 |
| JP | 2001016832 | A | 1/2001 |
| JP | 2002146492 | A | 5/2002 |
| JP | 2003153503 | A | 5/2003 |
| JP | 2003189515 | A | 7/2003 |
| JP | 2003264962 | A | 9/2003 |
| JP | 2005191033 | A | 7/2005 |
| JP | 2005332976 | A | 12/2005 |
| JP | 2007311652 | A | 11/2007 |
| JP | 2010105760 | A | 5/2010 |
| JP | 4581228 | B2 | 11/2010 |
| JP | 2012050989 | A | 3/2012 |
| JP | 2012240067 | A | 12/2012 |
| JP | 5630150 | B2 | 11/2014 |
| TW | 181392 | | 7/1980 |
| WO | 2012155232 | A1 | 11/2012 |

OTHER PUBLICATIONS

Taiwanese Office Action with Search Report for Taiwanese Application No. 105128123, dated Jul. 13, 2017, 7 pages.
Canadian Office Action for Canadian Application No. 2997237, dated Sep. 16, 2019, 5 pages.
Extended European Search Report for European Application No. 16 841 554.5, dated Feb. 25, 2019, 8 pages.
Korean Office Action for Korean Application No. 10-2018-7005250, dated May 31, 2019 with Concise Statement of Relevance of Office Action, 6 pages.
Canadian Office Action for Canadian Application No. 2,997,237, dated Apr. 9, 2020, 8 pages.
Chinese Office Action for Chinese Application No. 201680050466.X, dated Oct. 17, 2018, with Concise Statement of Search Report— 11 pages.

* cited by examiner

# LAMINATED CORE MANUFACTURING APPARATUS AND LAMINATED CORE MANUFACTURING METHOD

CROSS REFERENCE TO RELATED APPLICATIONS

This is the U.S. National Phase application of PCT/JP2016/074341, filed Aug. 22, 2016, which claims priority to Japanese Patent Application No. 2015-174695, filed Sep. 4, 2015, the disclosures of these applications being incorporated herein by reference in their entireties for all purposes.

TECHNICAL FIELD OF THE INVENTION

The present invention relates to a laminated core manufacturing device and a laminated core manufacturing method for manufacturing a laminated core.

BACKGROUND OF THE INVENTION

In the related art, a steel sheet having a high magnetic permeability such as an electrical steel sheet is used as a material for manufacturing a laminated core, that is, a laminated core material. Generally, in manufacturing a laminated core, a thin steel sheet having a high magnetic permeability (for example, an electrical steel sheet with a reduced sheet thickness), as a laminated core material, is fed into a pressing machine and punched out into a core shape by the pressing machine. The core-shaped steel sheet structure punched out by the pressing machine in this manner (hereinafter referred to as a "punched out body") is laminated over one another in a thickness direction thereof to be integrated together. Accordingly, a laminated core used for an electric motor core and the like are manufactured.

In recent years, the field of electric motors is holding high expectations for high efficiency in performance of an electric motor (rotational motion) due to demands for energy saving. In an electrical steel sheet or a laminated core material, a material with a thin sheet thickness is required for purpose of reducing eddy current loss of a laminated core generated when rotating an electric motor at high speed. Such a requirement leads to an increase in demand for an electrical steel sheet having a sheet thickness of 0.35 mm or less. A future aim to further improve efficiency of an electric motor using a laminated core causes a trend to further reduce an electrical steel sheet in sheet thickness. However, further reduction in sheet thickness of an electrical steel sheet increases the number of laminated electrical steel sheets required for manufacturing a laminated core. Such an increase in the number of laminated electrical steel sheets prolongs the time required for punching out an electrical steel sheet as a laminated core material, which results in a decrease in production efficiency of a laminated core.

As a solution to these problems, such a technique has been proposed in the related art that a plurality of steel sheets is punched out simultaneously to enhance efficiency. For example, Patent Literature 1 discloses a method for manufacturing an electric motor core. Herein, before punching out a plurality of electrical steel sheets by a pressing machine, those parts in the electrical steel sheets that are not used for the electric motor core are fixed to each other so as to adhere the plurality of electrical steel sheets to each other. In a method disclosed in Patent Literature 2, an adhesive layer is formed between a plurality of electrical steel sheets so as not to surround a non-adhesive region, and the formed adhesive layer partially bonds the plurality of electrical steel sheets.

Patent Literature 3 discloses a method of applying an inorganic adhesive containing alumina or silica as a main component to a plurality of electrical steel sheets so as to bond the plurality of electrical steel sheets. Patent Literature 4 discloses a method of bonding a plurality of electrical steel sheets with an adhesive layer of an organic resin having a glass transition temperature or softening temperature of 50° C. or higher.

In a method disclosed in Patent Literature 5, plurality of electrical steel sheets is bonded with an adhesive film interposed between the plurality of electrical steel sheets so as to make a multi-layered laminated steel sheet, and this multi-layered laminated steel sheet is punched out by a pressing machine, thereby manufacturing a laminated core. In a method disclosed in Patent Literature 6, two pieces of steel sheets each having different thicknesses at both ends in a direction perpendicular to a rolling direction are overlapped in such a manner that the end with the larger thickness lies adjacent to the end with the smaller thickness, and the two steel sheets are simultaneously punched out by a pressing machine to form a punched out body (a core member) having a predetermined shape, and the punched out body is sequentially laminated in such a manner that each rolling direction is brought into line, thereby producing a laminated core.

However, punching out steel sheets may lead to meandering of the steel sheets, which causes a trouble and decreases efficiency. In order to solve this problem, Patent Literature 7 discloses a side guide device configured to hold ends in a width direction of a metallic band that travels through a process line so as to prevent meandering of the metallic band. In a device and a method disclosed in Patent Literature 8, an amount of meandering which is an amount of positional variation in a width direction of steel sheets is detected in a process line, and a steering roller is inclined in a horizontal plane with respect to a traveling direction of the steel sheets based on the detected amount of meandering of the steel sheets, thereby correcting the meandering of the steel sheets.

CITATION LIST

Patent Literature

Patent Literature 1: JP 2003-153503 A
Patent Literature 2: JP 2003-264962 A
Patent Literature 3: JP 2005-332976 A
Patent Literature 4: JP 4581228 B2
Patent Literature 5: JP 2005-191033 A
Patent Literature 6: JP 2003-189515 A
Patent Literature 7: JP 60-15412 Y
Patent Literature 8: JP 2012-240067 A

SUMMARY OF THE INVENTION

However, in the conventional techniques disclosed in Patent Literatures 1 to 6, a plurality of laminated core materials that is overlapped to be simultaneously punched out by a pressing machine may shift in a direction perpendicular to a rolling direction (that is, in a width direction of the laminated core materials) before being fixed with an adhesive layer or caulking and the like. Such shift may cause the laminated core materials to collide against an inner wall of a die in the pressing machine or may cause the laminated core materials to fall off the die in the pressing machine.

Particularly, in overlapping a plurality of laminated core materials and continuously punching out the same to manufacture a laminated core, when each thickness of the plurality of laminated core materials is inclined in the width direction of the laminated core materials as exemplified in Patent Literature 6, the following problem may occur. That is, when overlapping the plurality of laminated core materials, the plurality of overlapped laminated core materials shifts to the opposite directions in the width direction of the laminated core materials due to their own weights or a load received from a pinch roller, which is a serious problem. This problem may lead to such troubles that the laminated core materials collide against an inner wall of a die or the laminated core materials fall off the die as described above (hereinafter referred to as the troubles due to shift in the width direction of the laminated core materials).

In order to solve such troubles due to shift in the width direction of the laminated core materials, it seems efficient to correct meandering of the plurality of laminated core materials before overlapping the laminated core materials, using the side guide device disclosed in Patent Literature 7 or the steering roller disclosed in Patent Literature 8. However, in the side guide device disclosed in Patent Literature 7, the laminated core materials that come into contact with a side guide may be lifted up, which causes a trouble that the laminated core materials clog the die. Furthermore, in the meandering correction technique disclosed in Patent Literature 8, it is required to install the steering roller configured to correct meandering and a detection device configured to detect positions of ends (hereinafter, appropriately referred to as edges) in the width direction of the laminated core materials (hereinafter appropriately referred to as edge positions) in accordance with the number of overlapped laminated core materials. Installation of such devices increases installation costs and running costs of the devices and causes troublesome maintenance of the devices.

Aspects of the present invention have been made in light of the aforementioned situations, and an object of aspects of the present invention is to provide a laminated core manufacturing device and a laminated core manufacturing method capable of suppressing, to the extent possible, shift in edge positions and uplift of a plurality of laminated core materials overlapped and punched out to manufacture a laminated core.

As a result of intensive studies to solve the aforementioned problems, the present inventors have found that a plurality of laminated core materials overlapped with edge positions being aligned can be stably fed into a punching die by using the following mechanisms: a mechanism to align the edge positions of the plurality of overlapped laminated core materials; a mechanism to correct the edge positions; and a mechanism to prevent uplift, thereby developing aspects of the present invention. To solve the problem and achieve the object, a laminated core manufacturing device for manufacturing at least a punched out body of a plurality of laminated core materials used for manufacturing a laminated core according to aspects of the present invention includes: an overlapping unit configured to overlap the plurality of laminated core materials conveyed along different conveyance routes; an edge aligning unit configured to align edge positions in a width direction of the plurality of laminated core materials between the plurality of laminated core materials; an uplift prevention unit configured to prevent uplift of the plurality of laminated core materials whose edge positions are aligned by the edge aligning unit; an edge position correction unit configured to correct the edge positions in the width direction of the plurality of laminated core materials; and a punching unit configured to punch out the plurality of laminated core materials which are overlapped by the overlapping unit and have been subjected to an edge position alignment process performed by the edge aligning unit, an uplift prevention process performed by the uplift prevention unit, and an edge position correction process performed by the edge position correction unit, so as to obtain the punched out body.

Moreover, in the laminated core manufacturing device according to aspects of the present invention, the edge aligning unit is installed just behind an outlet of the overlapping unit, or installed just before an inlet and just behind the outlet of the overlapping unit.

Moreover, in the laminated core manufacturing device according to aspects of the present invention, the edge aligning unit includes: a pair of side rollers facing each other in the width direction of the plurality of laminated core materials; and a spring configured to generate elastic force to bias the pair of side rollers in a facing direction, wherein the elastic force of the spring increases or decreases in accordance with a difference between a maximum edge-to-edge distance and a reference interval when the maximum edge-to-edge distance, which is a distance between farthest edges in the width direction of the plurality of laminated core materials, exceeds the reference interval between the pair of side rollers, and wherein the pair of side rollers sandwiches the plurality of laminated core materials in the width direction by the elastic force of the spring so as to align the edge positions.

Moreover, in the laminated core manufacturing device according to aspects of the present invention, the edge aligning unit is provided with the pair of side rollers and includes a pair of side roller stages movable in the width direction of the plurality of laminated core materials.

Moreover, a laminated core manufacturing method for manufacturing at least a punched out body of a plurality of laminated core materials used for manufacturing a laminated core according to aspects of the present invention includes:

an overlapping step of overlapping the plurality of laminated core materials conveyed along different conveyance routes; an edge aligning step of aligning edge positions in a width direction of the plurality of laminated core materials between the plurality of laminated core materials; an uplift prevention step of preventing uplift of the plurality of laminated core materials whose edge positions are aligned in the edge aligning step; an edge position correction step of correcting the edge positions in the width direction of the plurality of laminated core materials; and a punching step of punching out the plurality of laminated core materials which have been overlapped in the overlapping step, and subjected to an edge position alignment process in the edge aligning step, an uplift prevention process in the uplift prevention step, and an edge position correction process in the edge position correction step, so as to obtain the punched out body.

According to aspects of the present invention, it is possible to suppress, to the extent possible, shift in edge positions and uplift of a plurality of laminated core materials overlapped and punched out to manufacture a laminated core.

DETAILED DESCRIPTION OF EMBODIMENTS OF THE INVENTION

Figure 1:
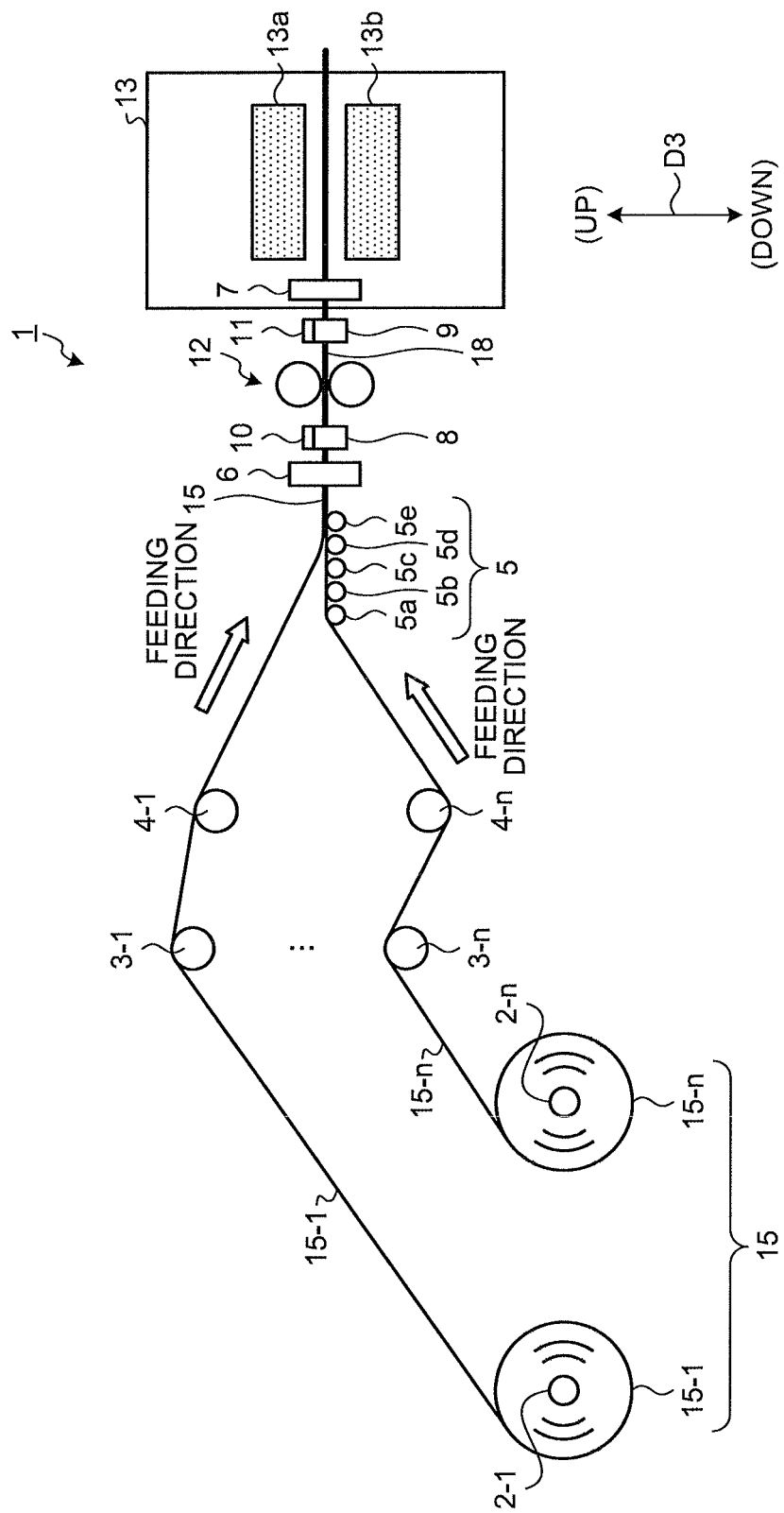
FIG. 1 is a view illustrating an exemplary structure of a laminated core manufacturing device according to an embodiment of the present invention.

Hereinafter, a preferred embodiment of a laminated core manufacturing device and a laminated core manufacturing method according to aspects of the present invention will be described in detail with reference to the accompanying drawings. It should be noted that the present invention is not limited by this embodiment. It should also be noted that the drawings are schematic views and that dimensional relationships, ratios, and the like of components may differ from the actual ones. The dimensional relationships and ratios of the components may also differ between the drawings. In each drawing, the same components are denoted with the same reference numerals.

(Structure of Laminated Core Manufacturing Device)

Figure 2:
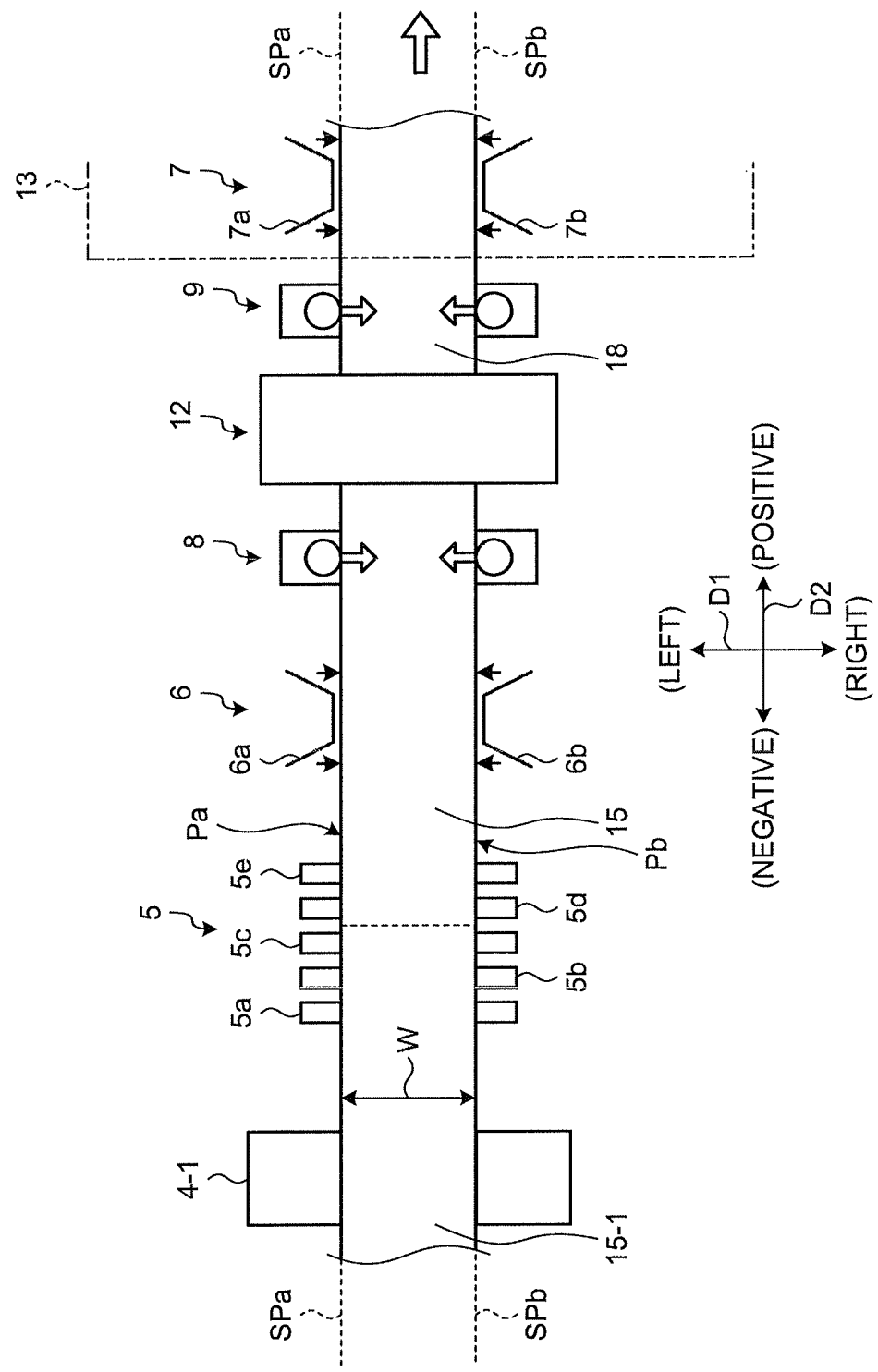
FIG. 2 is a view illustrating an exemplary structure of main parts in the laminated core manufacturing device according to the embodiment of the present invention.

First, a structure of a laminated core manufacturing device according to the embodiment of the present invention will be described. FIG. 1 is a view illustrating an exemplary structure of the laminated core manufacturing device according to the embodiment of the present invention. FIG. 2 is a view illustrating an exemplary structure of main parts in the laminated core manufacturing device according to the embodiment of the present invention. As illustrated in FIGS. 1 and 2, a laminated core manufacturing device 1 according to the embodiment of the present invention includes a plurality of discharging units 2-1 to 2-n that discharges n-pieces (n represents an integer of 2 or more, the same applies hereinafter) of steel sheets 15-1 to 15-n as laminated core materials (hereinafter appropriately abbreviated as a "plurality of steel sheets 15"); and a plurality of feed rollers 3-1 to 3-n, and 4-1 to 4-n that feeds the plurality of steel sheets 15 along corresponding conveyance routes. The laminated core manufacturing device 1 further includes a feed roller group 5 that overlaps the plurality of steel sheets 15 while conveying the same; edge position correction units 6 and 7 that correct edge positions of the plurality of steel sheets 15; edge aligning units 8 and 9 that align the edge positions of the plurality of steel sheets 15; and uplift prevention units 10 and 11 that prevent uplift of the plurality of steel sheets 15. The laminated core manufacturing device 1 also includes a pinch roller 12 that overlaps the plurality of steel sheets 15; and a pressing machine 13 that punches out the plurality of overlapped steel sheets 15.

FIG. 2 illustrates the structure from the feed roller 4-1 to the edge position correction unit 7 in the laminated core manufacturing device 1 as viewed from above (from the upper side in a thickness direction D3 of the plurality of steel sheets 15). The uplift prevention units 10 and 11 are not illustrated in FIG. 2 in order to easily describe a process of aligning the edge positions of the plurality of steel sheets 15 by the edge aligning units 8 and 9.

The discharging units 2-1 to 2-n are equipment configured to discharge the plurality of steel sheets 15. Specifically, each of the discharging units 2-1 to 2-n includes a payoff reel and the like, being installed at an end of an inlet in the laminated core manufacturing device 1. The discharging units 2-1 to 2-n respectively receive n-pieces of steel sheets 15-1 to 15-n (or n-number of steel sheets 15 when they have a coil-like shape) as a plurality of laminated core materials used for manufacturing a laminated core, and then respectively and sequentially discharge the steel sheets 15-1 to 15-n to the corresponding conveyance routes.

In this embodiment, the n-pieces of steel sheets 15-1 to 15-n are all thin plate-like electrical steel sheets having high magnetic permeability (non-oriented electrical steel sheets and the like). As illustrated in FIG. 1, these steel sheets 15-1 to 15-n are respectively received by the discharging units 2-1 to 2-n in a coiled state.

The feed rollers 3-1 to 3-n, and 4-1 to 4-n are equipment configured to feed the plurality of steel sheets 15 from upstream of the conveyance routes to downstream thereof. Specifically, as illustrated in FIG. 1, the feed rollers 3-1 to 3-n are both installed in the subsequent stage of the discharging units 2-1 to 2-n, and the feed rollers 4-1 to 4-n are both installed in the subsequent stage of these feed rollers 3-1 to 3-n. The feed rollers 3-1 to 3-n respectively and sequentially feed the steel sheets 15-1 to 15-n discharged from the discharging units 2-1 to 2-n to the feed rollers 4-1 to 4-n by the corresponding conveyance routes. The feed rollers 4-1 to 4-n respectively and sequentially feed the steel sheets 15-1 to 15-n fed from the feed rollers 3-1 to 3-n in the preceding stage to the feed roller group 5 by the corresponding conveyance routes.

The feed roller group 5 is equipment configured to overlap the plurality of steel sheets 15 while conveying the same from upstream of the conveyance routes to downstream thereof. Specifically, as illustrated in FIG. 1, the feed roller group 5 includes a plurality of (five in this embodiment) feed rollers 5a to 5e arranged along the conveyance routes of the plurality of steel sheets 15. The number of feed rollers disposed in the feed roller group 5 is not particularly limited to five, but may be any number as long as it is necessary for conveying and overlapping the plurality of steel sheets 15.

In such a feed roller group 5, at least one of the feed rollers 5a to 5e receives the steel sheets 15-1 to 15-n fed from the feed rollers 4-1 to 4-n along feeding directions (see thick arrows in FIG. 1) by the corresponding conveyance routes. The feed roller group 5 sequentially feeds the steel sheets 15-1 to 15-n from upstream of the conveyance routes to downstream thereof by the feed rollers 5a to 5e, and simultaneously overlaps the steel sheets 15-1 to 15-n in the thickness direction D3 at a position corresponding to any one of the feed rollers 5a to 5e. In the plurality of steel sheets 15 herein, the steel sheets 15-1 to 15-n are overlapped with each other on the feed roller group 5 under their own weights. The feed roller group 5 sequentially feeds the plurality of steel sheets 15 overlapped in this manner to the edge position correction unit 6.

The edge position correction units 6 and 7 are equipment configured to correct the edge positions in a width direction D1 of the plurality of laminated core materials. Specifically, as illustrated in FIGS. 1 and 2, the edge position correction unit 6 includes a pair of side guides 6a, 6b facing each other in the width direction D1 of the plurality of steel sheets 15, being installed at positions in the preceding stage of the pinch roller 12 and between the feed roller group 5 and the edge aligning unit 8 (particularly, in the preceding stage of the edge aligning unit 8). A separation distance in a facing direction (the width direction D1) of the pair of side guides 6a and 6b is slightly larger than a sheet width W of each of the plurality of steel sheets 15 (for example, the sheet width W of the steel sheet 15-1) so that the plurality of steel sheets 15 which is not meandering can pass through between the side guides 6a and 6b without difficulty.

Using the side guides 6a and 6b, from both right and left sides in the width direction D1, the edge position correction unit 6 corrects meandering of the plurality of steel sheets 15 conveyed from the feed roller group 5 toward the pinch roller 12. Accordingly, the edge position correction unit 6 corrects edge positions Pa and Pb of the plurality of steel sheets 15 (each edge position of the overlapped steel sheets 15-1 to 15-n). Thus, in regard to the edge position Pa on the left side in the width direction D1 in the plurality of steel sheets 15, the edge position correction unit 6 reduces an amount of shift from a standard edge position SPa, and in regard to the edge position Pb on the right side in the width direction D1 in the plurality of steel sheets 15, the edge position correction unit 6 reduces an amount of shift from a standard edge position SPb.

As illustrated in FIGS. 1 and 2, the edge position correction unit 7 includes a pair of side guides 7a and 7b facing each other in the width direction D1 of the plurality of steel sheets 15, being installed at positions in the subsequent stage of the pinch roller 12, particularly, in the subsequent stage of the edge aligning unit 9. In this embodiment, the edge position correction unit 7 is installed just before an inlet of an upper die 13a and a lower die 13b of the pressing machine 13. A separation distance in a facing direction (the width direction D1) of the pair of side guides 7a and 7b is slightly larger than each sheet width W of the plurality of steel sheets 15 so that an overlapped body 18 of the plurality of steel sheets 15 which is not meandering can pass through between the side guides 7a and 7b without difficulty.

Using the side guides 7a and 7b, from both right and left sides in the width direction D1, the edge position correction unit 7 corrects meandering of the overlapped body 18 of the plurality of steel sheets 15 conveyed from the pinch roller 12 (particularly, from the edge aligning unit 9) toward the dies (the upper die 13a and lower die 13b) of the pressing machine 13. Accordingly, the edge position correction unit 7 corrects edge positions Pa and Pb of the overlapped body 18 (each edge position of the overlapped steel sheets 15-1 to 15-n). Thus, in regard to the edge position Pa on the left side in the width direction D1 in the overlapped body 18, the edge position correction unit 7 reduces an amount of shift from the standard edge position SPa, and in regard to the edge position Pb on the right side in the width direction D1 in the overlapped body 18, the edge position correction unit 7 reduces an amount of shift from the standard edge position SPb.

Herein, the standard edge positions SPa and SPb are references of the right and left edges in the width direction D1 of the steel sheets 15-1 to 15-n, and are common between the steel sheets 15-1 to 15-n. Such standard edge positions SPa and SPb are set, for example, in accordance with positions and the like of the upper die 13a and lower die 13b so as to match with optimal positions as the edge positions of the plurality of steel sheets 15 that is to be conveyed between the upper die 13a and the lower die 13b of the pressing machine 13.

The edge aligning units 8 and 9 are equipment configured to align the edge positions in the width direction D1 of the plurality of laminated core materials between the plurality of laminated core materials. In this embodiment, as illustrated in FIGS. 1 and 2, the edge aligning units 8 and 9 are installed in the preceding stage of the pressing machine 13, respectively being installed at a position just before an inlet and a position just behind an outlet of the pinch roller 12 that presses and overlaps the plurality of steel sheets 15. In other words, as illustrated in FIGS. 1 and 2, between the edge aligning units 8 and 9 and the pinch roller 12, there is no equipment that affects the conveyance of the laminated core materials such as feed rollers.

At the position just before the inlet of the pinch roller 12, the edge aligning unit 8 sandwiches the plurality of steel sheets 15 conveyed from the edge position correction unit 6 toward the pinch roller 12 from both right and left sides in the width direction D1, using a pair of rotative rolling bodies that receives action of elastic force of the after-mentioned spring. Accordingly, the edge aligning unit 8 aligns the edge positions of the plurality of steel sheets 15 between the steel sheets 15-1 to 15-n.

At the position just behind the outlet of the pinch roller 12, the edge aligning unit 9 sandwiches the plurality of steel sheets 15 (particularly, the overlapped body 18) conveyed from the pinch roller 12 toward the pressing machine 13 from both right and left sides in the width direction D1, using a pair of rotative rolling bodies that receives action of elastic force of the after-mentioned spring. Accordingly, the edge aligning unit 9 aligns the edge positions of the plurality of steel sheets 15, that is, the edge positions of the overlapped body 18, between the steel sheets 15-1 to 15-n.

The uplift prevention units 10 and 11 are structures configured to prevent uplift of the plurality of laminated core materials whose edge positions are aligned by the edge aligning units 8 and 9. Specifically, as illustrated in FIG. 1, the uplift prevention unit 10 is provided on an upper part of the edge aligning unit 8 positioned just before the inlet of the pinch roller 12. The uplift prevention unit 10 prevents uplift of the plurality of steel sheets 15 whose edge positions are aligned by the edge aligning unit 8. In other words, the uplift prevention unit 10 prevents uplift of each edge of the steel sheets 15-1 to 15-n overlapped in the thickness direction D3 due to the action of the edge aligning unit 8.

As illustrated in FIG. 1, the uplift prevention unit 11 is provided on an upper part of the edge aligning unit 9 positioned just behind the outlet of the pinch roller 12. The uplift prevention unit 11 prevents uplift of the plurality of steel sheets 15 (particularly, the overlapped body 18) whose edge positions are aligned by the edge aligning unit 9. In other words, the uplift prevention unit 11 prevents uplift of each edge of the steel sheets 15-1 to 15-n overlapped in the thickness direction D3, as the overlapped body 18, due to the action of the edge aligning unit 9.

The pinch roller 12 functions as an overlapping unit configured to overlap the plurality of steel sheets 15 as the plurality of laminated core materials conveyed along different conveyance routes. Specifically, as illustrated in FIG. 1, the pinch roller 12 includes a pair of upper and lower rotative rollers and the like, and as illustrated in FIGS. 1 and 2, the pinch roller 12 is installed at a position in the preceding stage of the pressing machine 13, in this embodiment, at a position between the edge aligning units 8 and 9. The pinch roller 12 sandwiches the plurality of steel sheets 15 conveyed through the edge aligning unit 8 from above and below, thereby overlapping the plurality of steel sheets 15 while pressing the same in the thickness direction D3. In this manner, the pinch roller 12 obtains the overlapped body 18 of the plurality of steel sheets 15.

In this embodiment, the overlapped body 18 is a laminated structure in which the steel sheets 15-1 to 15-$n$ are overlapped in the thickness direction D3 and is prevented from being lifted by the uplift prevention unit 10, having the edge positions corrected by the edge position correction unit 6 and aligned by the edge aligning unit 8. As described above, the pinch roller 12 sequentially feeds the overlapped body 18 toward the edge aligning unit 9 disposed close to the pressing machine 13 while overlapping the plurality of steel sheets 15.

The pressing machine 13 functions as a punching unit configured to punch out the plurality of steel sheets 15 overlapped by the pinch roller 12 (that is, the overlapped body 18) so as to obtain a punched out body of the laminated core materials. Specifically, as illustrated in FIG. 1, the pressing machine 13 is provided with the upper die 13$a$ and the lower die 13$b$ as dies for punching, being installed at a position in the subsequent stage of the pinch roller 12, particularly, in the subsequent stage of the edge aligning unit 9. Herein, the edge position correction unit 7 is positioned just before the inlet of the upper die 13$a$ and the lower die 13$b$. The pressing machine 13 receives the overlapped body 18 into the dies, that is, between the upper die 13$a$ and the lower die 13$b$, and sandwiches the received overlapped body 18 by the upper die 13$a$ and the lower die 13$b$ so as to restrain the same. Next, the pressing machine 13 simultaneously punches out the overlapped body 18 in the thickness direction D3, using the upper die 13$a$ and the lower die 13$b$. The overlapped body 18 punched out by the pressing machine 13 in this manner is the steel sheets 15-1 to 15-$n$ overlapped by the pinch roller 12. The plurality of steel sheets 15 herein is subjected to the following processes: alignment of the edge positions performed by the edge aligning units 8 and 9; prevention of uplift performed by the uplift prevention units 10 and 11; and correction of the edge positions performed by the edge position correction unit 6 and 7.

By the aforementioned punching process, the pressing machine 13 obtains the punched out body of the laminated core materials punched out into a target core shape from the steel sheets 15-1 to 15-$n$ that forms the overlapped body 18. Every time the overlapped body 18 is received into the dies by the pinch roller 12, the pressing machine 13 continuously punches out the punched out body into the target core shape from the steel sheets 15-1 to 15-$n$ that forms the received overlapped body 18, so as to obtain a plurality of punched bodies having the target core shape. The pressing machine 13 laminates the plurality of punched bodies obtained in this manner so that rolling directions of the steel sheets 15-1 to 15-$n$, which are the materials, align in the same direction. The pressing machine 13 then integrates the punched bodies by action of the upper die 13$a$ and the lower die 13$b$, so as to manufacture a desired laminated core.

In the embodiment of the present invention, the width direction D1 is a direction in which each sheet width of the plurality of steel sheets 15 as the laminated core materials stretches. The longitudinal direction D2 is a direction in which the plurality of steel sheets 15 stretches longitudinally, that is, a rolling direction of each of the steel sheets 15-1 to 15-$n$. The steel sheets 15-1 to 15-$n$ are conveyed in such a longitudinal direction D2. The thickness direction D3 is a direction in which each sheet thickness of the plurality of steel sheets 15 stretches. Particularly, when the plurality of steel sheets 15 such as the aforementioned overlapped body 18 is in an overlapped state, the thickness direction D3 is the same as a direction in which of the plurality of steel sheets 15 is overlapped (lamination direction). The width direction D1, the longitudinal direction D2, and the thickness direction D3 are perpendicular to each other.

Furthermore, the right side in the width direction D1 is the right side in a direction of conveyance of the plurality of steel sheets 15 (feeding direction), and the left side in the width direction D1 is the left side in the direction of conveyance. The positive direction in the longitudinal direction D2 is a direction in which the plurality of steel sheets 15 advances (travels) as being conveyed, and the negative direction in the longitudinal direction D2 is the opposite direction of this positive direction. The upper side in the thickness direction D3 is a direction heading vertically upward, and the lower side in the thickness direction D3 is a direction heading vertically downward.

(Structure of Edge Aligning Unit)

Figure 3:
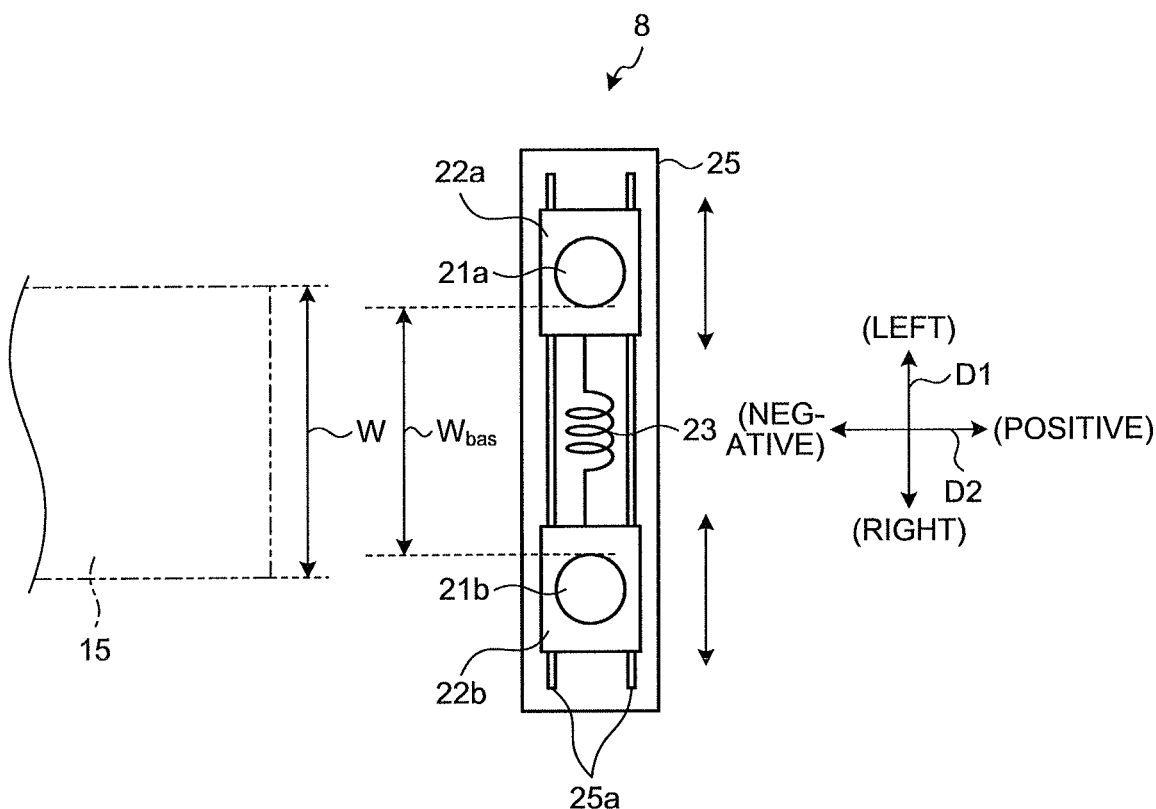
FIG. 3 is a view illustrating an exemplary structure of an edge aligning unit configured to align edge positions of a plurality of steel sheets in the embodiment of the present invention.
Figure 4:
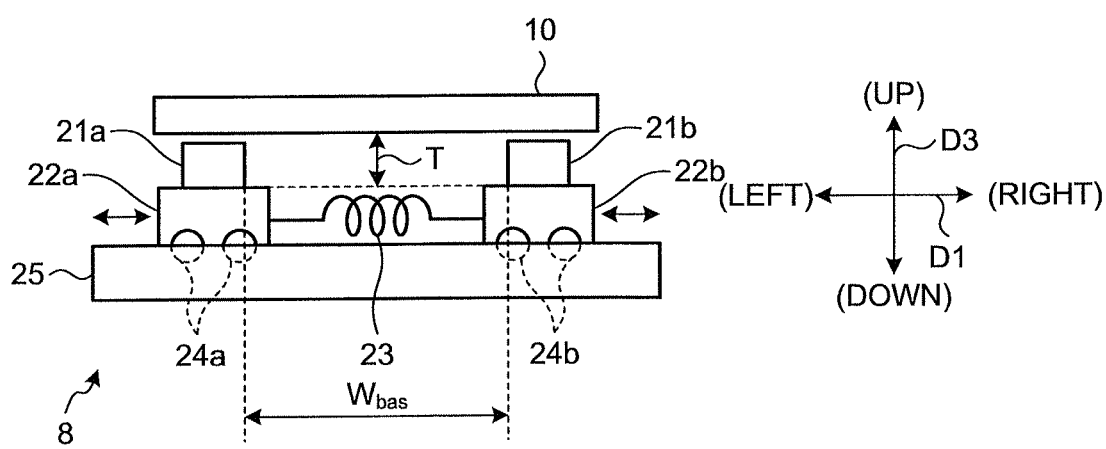
FIG. 4 is a view of the edge aligning unit illustrated in FIG. 3 as viewed from a longitudinal direction of a to-be-processed steel sheet.

Next, structures of the edge aligning units 8 and 9 that align the edge positions of the steel sheets 15-1 to 15-$n$ in the embodiment of the present invention will be described in detail. FIG. 3 is a view illustrating an exemplary structure of the edge aligning unit configured to align the edge positions of the plurality of steel sheets in the embodiment of the present invention. FIG. 4 is a view of the edge aligning unit illustrated in FIG. 3 as viewed from the longitudinal direction of a to-be-processed steel sheet. FIG. 4 also illustrates the uplift prevention unit 10 provided on the upper part of the edge aligning unit 8. Hereinafter, the edge aligning unit 8 will be exemplified on behalf of the edge aligning units 8 and 9, and the structure of the edge aligning unit 8 will be described with reference to FIGS. 3 and 4. The remaining edge aligning unit 9 is similar to the edge aligning unit 8 except that the position to be installed is different.

As illustrated in FIGS. 3 and 4, the edge aligning unit 8 includes a pair of side rollers 21$a$ and 21$b$ facing each other in the width direction D1 of the plurality of steel sheets 15 to be processed (see FIGS. 1 and 2); a pair of side roller stages 22$a$ and 22$b$, serving as movable stages, on which the side rollers 21$a$ and 21$b$ are disposed respectively; a spring 23 configured to generate elastic force to bias the pair of side rollers 21$a$ and 21$b$ in a facing direction; and a basement 25 provided with a rail 25$a$ to regulate moving directions and an amount of movement of the pair of side roller stages 22$a$ and 22$b$.

The pair of side rollers 21$a$ and 21$b$ are rotative rolling bodies facing each other in the width direction D1. One of the side rollers 21$a$ is rotatably attached to an upper surface of the side roller stage 22$a$ about an axis (not illustrated) in the thickness direction D3. The other side roller 21$b$ is rotatably attached to an upper surface of the side roller stage 22$b$ about an axis (not illustrated) in the thickness direction D3. As illustrated in FIGS. 3 and 4, in regard to the pair of side rollers 21$a$ and 21$b$ attached to the pair of side roller stages 22a and 22b in such manners, each peripheral surface faces each other in the width direction D1.

The pair of side roller stages 22a and 22b is respectively provided with the pair of side rollers 21a and 21b, serving as the movable stands in the width direction D1. Specifically, as illustrated in FIG. 4, one of the side roller stages 22a (the left side in the width direction D1) is provided with the side roller 21a on the upper surface and a wheel 24a on the lower part. The side roller stage 22a is installed in such a manner that the wheel 24a is mounted on the rail 25a of the basement 25 illustrated in FIG. 3, being movable together with the side roller 21a in the width direction D1 along the rail 25a. The other side roller stage 22b (the right side in the width direction D1) is provided with the side rollers 21b on the upper surface and a wheel 24b on the lower part. The side roller stage 22b is installed in such a manner that the wheel 24b is mounted on the rail 25a of the basement 25 illustrated in FIG. 3, being movable together with the side roller 21b in the width direction D1 along the rail 25a. Furthermore, the pair of side roller stages 22a and 22b mounted on the rail 25a makes the pair of side rollers 21a and 21b face each other in the width direction D1.

As illustrated in FIGS. 3 and 4, one end of the spring 23 is connected to the side roller stage 22a and the other end is connected to the side roller stage 22b so as to connect the pair of side roller stages 22a and 22b facing each other in the width direction D1. As the pair of side roller stages 22a and 22b separates from each other, the spring 23 extends from the natural length in the width direction D1. Accordingly, the spring 23 generates elastic force to bias the pair of side rollers 21a and 21b on the pair of side roller stages 22a and 22b in the facing direction (that is, a direction in which the pair of side rollers 21a and 21b approaches each other). The spring 23 applies the generated elastic force to the pair of side roller stages 22a and 22b to bias the pair of side roller stages 22a and 22b in the direction in which the pair of side rollers 21a and 21b approaches each other.

Herein, a reference interval $W_{bas}$ of the pair of side rollers 21a and 21b illustrated in FIGS. 3 and 4 can be set to any value in accordance with the spring 23 that connects the pair of side roller stages 22a and 22b as described above. In this embodiment, the reference interval $W_{bas}$ is a threshold of an interval between the pair of side rollers 21a and 21b facing each other in the width direction D1. For example, the reference interval $W_{bas}$ is defined as an interval between the pair of side rollers 21a and 21b on the pair of side roller stages 22a and 22b when the spring 23 is in a state of the natural length. When the interval between the pair of side rollers 21a and 21b is larger than the reference interval $W_{bas}$, the spring 23 generates the aforementioned elastic force. This elastic force of the spring 23 increases as the interval between the pair of side rollers 21a and 21b becomes larger than the reference interval $W_{bas}$.

In this embodiment, the reference interval $W_{bas}$ is set narrower than the sheet width W of the plurality of steel sheets 15 (particularly, each sheet width W of the steel sheets 15-1 to 15-n). Preferably, the reference interval $W_{bas}$ is set to such a degree that each of the plurality of steel sheets 15 is not deformed by pressing force in the width direction D1 (that is, the elastic force of the spring 23) received from the pair of side rollers 21a and 21b. More preferably, the reference interval $W_{bas}$ is set so as to satisfy the following Formula (1) represented with each sheet width W, and each sheet thickness t of the steel sheets 15-1 to 15-n.

$$W > W_{bas} > W - 50 \times t \quad (1)$$

The basement 25 is a stand provided with the rail 25a on which the wheels 24a and 24b of the pair of side roller stages 22a and 22b are placed. The rail 25a extends in a direction perpendicular to the feeding direction (longitudinal direction D2) of the plurality of steel sheets 15 and in a direction parallel to sheet surfaces of the plurality of steel sheets 15 (surfaces of the laminated core materials), that is, the width direction D1 (see FIG. 3). The rail 25a extending in the width direction D1 in this manner regulates the moving directions of the pair of side roller stages 22a and 22b in the width direction D1. The rail 25a also regulates movable ranges of the pair of side roller stages 22a and 22b in the width direction D1 in accordance with its own length (a rail length in the width direction D1).

As illustrated in FIG. 4, the uplift prevention unit 10 is provided on the upper part of the edge aligning unit 8. The uplift prevention unit 10 includes a plate-like member or a rotative rolling body that rotates about an axis in the width direction D1. As illustrated in FIG. 4, the uplift prevention unit 10 is installed so as to close the upper side of a space between the pair of side rollers 21a and 21b, forming a predetermined gap T above the upper surfaces of the pair of side roller stages 22a and 22b in the thickness direction D3.

Herein, between the uplift prevention unit 10 and the upper surfaces of the pair of side roller stages 22a and 22b provided with the pair of side rollers 21a and 21b, it is preferable to form a gap wide enough to allow the plurality of steel sheets 15 (n-pieces of steel sheets 15-1 to 15-n) overlapped in the thickness direction D3 to pass therethrough. In other words, the gap T between the uplift prevention unit 10 and the pair of side roller stages 22a and 22b is set so as to exceed a total sheet thickness (=n×t) of the n-pieces of overlapped steel sheets 15-1 to 15-n. Preferably, the gap T is set to 1/100 or less of each sheet width W of the steel sheets 15-1 to 15-n. More preferably, from a viewpoint of preventing the plurality of steel sheets 15 from being lifted and preventing the plurality of steel sheets 15 from getting caught in the uplift prevention unit 10, the gap T is set so as to satisfy the following Formula (2) represented with each sheet thickness t of the steel sheets 15-1 to 15-n and the number of overlapped sheets (the number of laminated sheets=n).

$$10 \times n \times t > T > 2 \times n \times t \quad (2)$$

The structure of the uplift prevention unit 10 is similar to the structure of the uplift prevention unit 11 provided on the upper part of the edge aligning unit 9 illustrated in FIG. 1. The uplift prevention units 10 and 11 are also similar in regard to the gap T illustrated in FIG. 4.

(Edge Aligning Operation)

Figure 5:
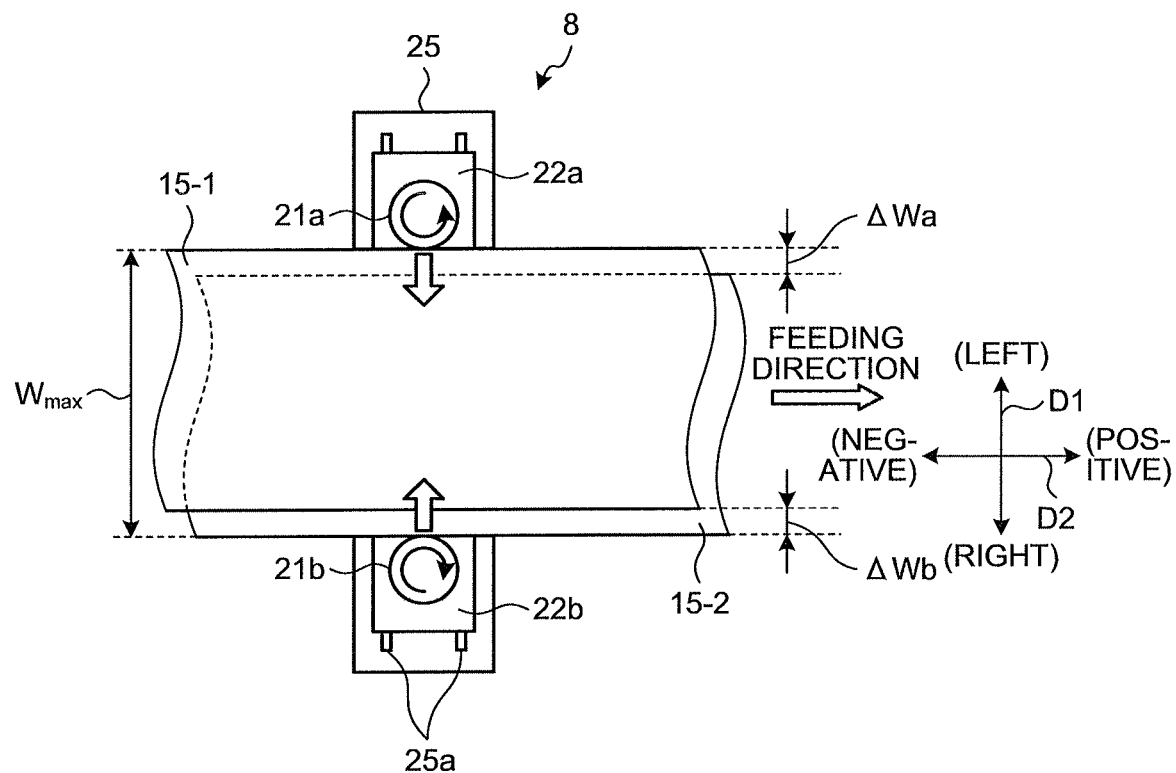
FIG. 5 is a view for describing an edge aligning operation for aligning the edge positions of the plurality of steel sheets in the embodiment of the present invention.
Figure 6:
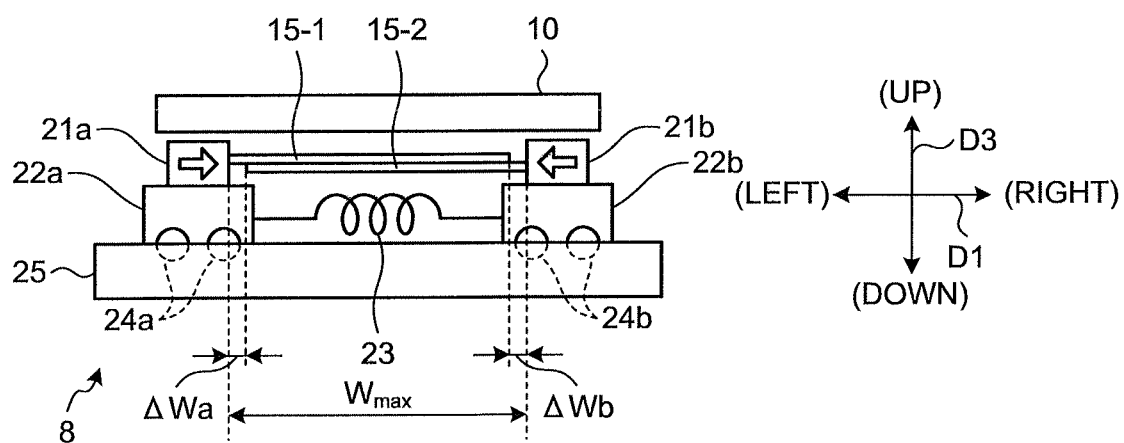
FIG. 6 is a view from another angle for describing the edge aligning operation for aligning the edge positions of the plurality of steel sheets in the embodiment of the present invention.

Next, an operation performed by the edge aligning units 8 and 9 to align the edge positions of the steel sheets 15-1 to 15-n in the embodiment of the present invention, that is, an edge aligning operation will be described in detail. FIG. 5 is a view for describing the edge aligning operation for aligning the edge positions of the plurality of steel sheets in the embodiment of the present invention. FIG. 6 is a view from another angle for describing the edge aligning operation for aligning the edge positions of the plurality of steel sheets in the embodiment of the present invention. FIG. 5 illustrates the edge aligning operation as viewed from the upper side in the thickness direction D3. FIG. 6 illustrates the edge aligning operation as viewed in a direction facing the feeding direction of the plurality of steel sheets 15 (the positive side in the longitudinal direction D2).

Hereinafter, the edge aligning unit 8 will be exemplified on behalf of the edge aligning units 8 and 9, and two steel sheets 15-1 and 15-2 will be exemplified as the plurality of steel sheets 15. Accordingly, the edge aligning operation for aligning the edge positions of the plurality of steel sheets 15 will be described with reference to FIGS. 5 and 6. The edge aligning operation by the remaining edge aligning unit 9 is similar to the edge aligning unit 8. Furthermore, in the edge aligning operation performed by the edge aligning units 8 and 9, a case where the number of overlapped sheets in the plurality of steel sheets 15 is two is similar to a case where the number of overlapped sheets is three or more.

As illustrated in FIGS. 5 and 6, between the pair of side rollers 21a and 21b, the edge aligning unit 8 receives the steel sheets 15-1 and 15-2 sequentially conveyed in an overlapped state in the thickness direction D3, and sandwiches the same in the width direction D1 with the pair of side rollers 21a and 21b facing each other in the width direction D1. The edge aligning unit 8 rotates the pair of side rollers 21a and 21b about the axes in the thickness direction D3 to continue conveyance (feeding) of the steel sheets 15-1 and 15-2 in the longitudinal direction D2. Simultaneously, the edge aligning unit 8 makes the pair of side rollers 21a and 21b act the elastic force of the spring 23 on the edges of the steel sheets 15-1 and 15-2, so as to align each edge position of the steel sheets 15-1 and 15-2.

Particularly, in the edge aligning unit 8 that performs the edge aligning operation as illustrated in FIGS. 5 and 6, the side roller 21a receives force from the left edge of the steel sheet 15-1 shifted to the left side in the width direction D1 relative to the steel sheet 15-2. The side roller stage 22a moves to the left side in the width direction D1 along the rail 25a of the basement 25 by the force acting on the side roller 21a from the steel sheet 15-1 in this manner. On the other hand, the side roller 21b receives force from the right edge of the steel sheet 15-2 shifted to the right side in the width direction D1 relative to the steel sheet 15-1. The side roller stage 22b moves to the right side in the width direction D1 along the rail 25a of the basement 25 by the force acting on the side roller 21b from the steel sheet 15-2 in this manner. In such manners, the pair of side roller stages 22a and 22b moves in directions apart from each other, which causes the interval between the pair of side rollers 21a and 21b to increase up to an interval equivalent to a maximum edge-to-edge distance $W_{max}$ of the steel sheets 15-1 and 15-2 as illustrated in FIGS. 5 and 6.

Herein, the maximum edge-to-edge distance $W_{max}$ is a distance between the farthest edges in the width direction D1 in the plurality of laminated core materials. In other words, in a case where the number of the plurality of steel sheets 15 as the plurality of laminated core materials is two: the steel sheets 15-1 and 15-2 as illustrated in FIGS. 5 and 6, the maximum edge-to-edge distance $W_{max}$ is determined by a distance between the farthest edges in the width direction D1 in these steel sheets 15-1 and 15-2. Specifically, the maximum edge-to-edge distance $W_{max}$ is a separation distance between the left edge of the steel sheet 15-1 shifted to the left side in the width direction D1 and the right edge of the steel sheet 15-2 shifted to the right side in the width direction D1.

As illustrated in FIGS. 5 and 6, when the edge positions of the steel sheets 15-1 and 15-2 shift in the width direction D1, the maximum edge-to-edge distance $W_{max}$ of the steel sheets 15-1 and 15-2 always becomes larger than the reference interval $W_{bas}$ (see FIGS. 3 and 4) between the pair of side rollers 21a and 21b. In other words, the interval between the pair of side rollers 21a and 21b sandwiching these steel sheets 15-1 and 15-2 in the width direction D1 exceeds the reference interval $W_{bas}$ and increases up to the interval equivalent to the maximum edge-to-edge distance $W_{max}$.

When the interval between the pair of side rollers 21a and 21b is larger than the reference interval $W_{bas}$, the spring 23 extends from the natural length in the width direction D1, generating the elastic force to bias the pair of side rollers 21a and 21b in the facing direction. When the maximum edge-to-edge distance $W_{max}$ of the steel sheets 15-1 and 15-2 exceeds the reference interval $W_{bas}$ between the pair of side rollers 21a and 21b, the elastic force of the spring 23 increases or decreases in accordance with a difference between the maximum edge-to-edge distance $W_{max}$ and the reference interval $W_{bas}$. Particularly, the elastic force of the spring 23 increases with an increase in a difference obtained by subtracting the reference interval $W_{bas}$ from the maximum edge-to-edge distance $W_{max}$, and decreases with a decrease in the difference. The spring 23 applies such elastic force to the pair of side roller stages 22a and 22b.

The pair of side roller stages 22a and 22b moves toward each other along the rails 25a by the applied elastic force of the spring 23. Furthermore, the pair of side roller stages 22a and 22b moves in the width direction D1 along the rail 25a in accordance with balance of the force acting on the pair of side rollers 21a and 21b from each edge of the steel sheets 15-1 and 15-2. Accordingly, the center position between the pair of side roller stages 22a and 22b moves close to the center position of the maximum edge-to-edge distance $W_{max}$ of the steel sheets 15-1 and 15-2.

Moving together with the pair of side roller stages 22a and 22b in an integrated manner, the pair of side rollers 21a and 21b is biased in the direction in which the pair of side rollers 21a and 21b approaches each other along the width direction D1 due to the elastic force of the spring 23 acting on the pair of side roller stages 22a and 22b. The pair of side rollers 21a and 21b sandwiches the plurality of steel sheets 15 in the width direction D1 by the elastic force of the spring 23 and aligns the edge positions of the plurality of steel sheets 15 between the steel sheets 15-1 to 15-n.

Specifically, as illustrated in FIGS. 5 and 6, one of the side rollers 21a (on the left side in the width direction D1) presses the left edge of the steel sheet 15-1 toward the right side in the width direction D1 by the elastic force of the spring 23 applied to the side roller stage 22a. Herein, as illustrated in FIGS. 5 and 6, in two steel sheets 15-1 and 15-2 whose edges are to be arranged, the steel sheet 15-1 shifts to the left side in the width direction D1 relative to the steel sheet 15-2. The side roller 21a presses the left edge of the steel sheet 15-1 in a direction indicated by thick arrows in FIGS. 5 and 6 so as to reduce (desirably, to zero) an amount of shift ΔWa of the left edge position of the steel sheet 15-1 relative to the steel sheet 15-2. Accordingly, the side roller 21a aligns the left edge position of the steel sheet 15-1 and the left edge position of the steel sheet 15-2. In this case, the side roller 21a rotates freely about the axis in the thickness direction D3 while coming into contact with the left edge of the steel sheet 15-1 or each left edge of the steel sheets 15-1 and 15-2 (see FIG. 5). Accordingly, the side roller 21a does not obstruct the conveyance (feeding) of the steel sheets 15-1 and 15-2 while aligning the left edge positions of the steel sheets 15-1 and 15-2.

As illustrated in FIGS. 5 and 6, the other side roller 21b (on the right side in the width direction D1) presses the right edge of the steel sheet 15-2 toward the left side in the width direction D1 by the elastic force of the spring 23 applied to the side roller stage 22b. Herein, as illustrated in FIGS. 5 and 6, in two steel sheets 15-1 and 15-2 whose edges are to be arranged, the steel sheet 15-2 shifts to the right side in the width direction D1 relative to the steel sheet 15-1. The side roller 21b presses the right edge of the steel sheet 15-2 in a direction indicated by thick arrows in FIGS. 5 and 6 so as to reduce (desirably, to zero) an amount of shift ΔWb of the right edge position of the steel sheet 15-2 relative to the steel sheet 15-1. Accordingly, the side roller 21b aligns the right edge position of the steel sheet 15-2 and the right edge position of the steel sheet 15-1. In this case, the side roller 21b rotates freely about the axis in the thickness direction D3 while coming into contact with the right edge of the steel sheet 15-2 or each right edge of the steel sheets 15-1 and 15-2 (see FIG. 5). Accordingly, the side roller 21b does not obstruct the conveyance (feeding) of the steel sheets 15-1 and 15-2 while aligning the right edge positions of the steel sheets 15-1 and 15-2.

Furthermore, as described above, the pair of side roller stages 22a and 22b moves in the width direction D1 along the rail 25a in accordance with balance of the force acting on the pair of side rollers 21a and 21b from each edge of the steel sheets 15-1 and 15-2. The pair of side rollers 21a and 21b moves in the width direction D1 together with such a pair of side roller stages 22a and 22b. Accordingly, the center position between the pair of side rollers 21a and 21b moves close to the center position of the maximum edge-to-edge distance $W_{max}$ of the steel sheets 15-1 and 15-2. In this case, the pair of side rollers 21a and 21b can apply the pressing force (that is, the elastic force of the spring 23) equally to the steel sheets 15-1 and 15-2 from both right and left sides in the width direction D1. An effect of this action contributes to an uplift-prevention effect of the steel sheets 15-1 and 15-2 by the uplift prevention unit 10 illustrated in FIG. 6, and enhances the uplift-prevention effect.

(Laminated Core Manufacturing Method)

Figure 7:
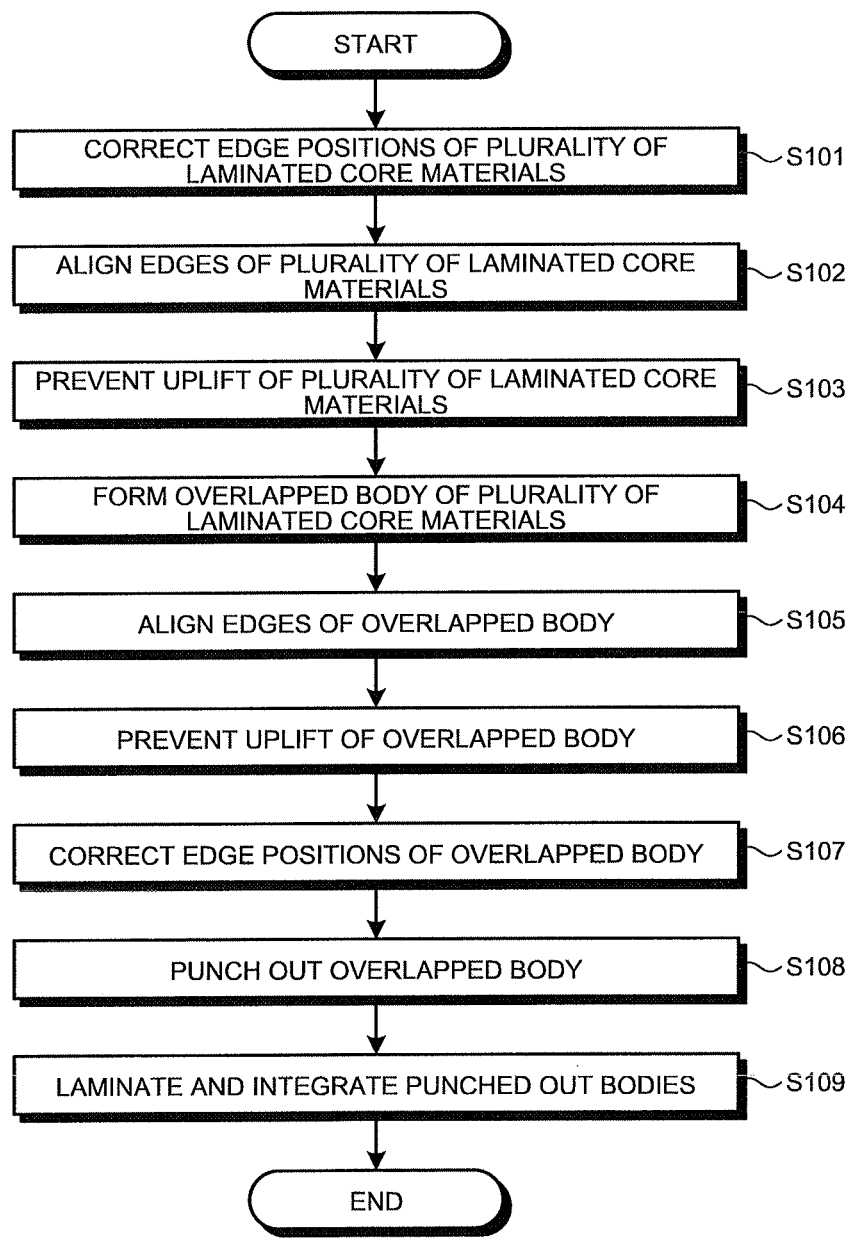
FIG. 7 is a flowchart illustrating an example of a laminated core manufacturing method according to the embodiment of the present invention.

Next, the laminated core manufacturing method according to the embodiment of the present invention will be described. FIG. 7 is a flowchart illustrating an example of the laminated core manufacturing method according to the embodiment of the present invention. In the laminated core manufacturing method according to the embodiment of the present invention, each process (operation) in Steps S101 to S109 illustrated in FIG. 7 is sequentially performed by the laminated core manufacturing device 1 so as to laminate and integrate a plurality of punched bodies of the laminated core materials, thereby manufacturing a laminated core.

In other words, in the laminated core manufacturing method according to the embodiment of the present invention, as illustrated in FIG. 7, the laminated core manufacturing device 1 corrects the edge positions of the plurality of laminated core materials overlapped while being conveyed along the different conveyance routes (Step S101).

In Step S101, the feed roller group 5 receives the plurality of steel sheets 15 conveyed along the different conveyance routes, and then overlaps the steel sheets 15-1 to 15-n of the plurality of steel sheets 15 in the thickness direction D3. The feed roller group 5 sequentially feeds the plurality of overlapped steel sheets 15 to the edge position correction unit 6 in the subsequent stage. Next, between the side guides 6a and 6b, the edge position correction unit 6 receives the plurality of steel sheets 15 fed from the feed roller group 5 in an overlapped state. The edge position correction unit 6 corrects meandering in the width direction D1 in the plurality of received steel sheets 15, using the side guides 6a and 6b. Accordingly, the edge position correction unit 6 corrects the edge positions of the plurality of steel sheets 15, that is, each edge position of the steel sheets 15-1 to 15-n. Such correction reduces the amount of shift of the edge positions of the plurality of steel sheets 15 (the edge positions Pa and Pb illustrated in FIG. 2) from the standard edge positions SPa and SPb. The edge position correction unit 6 corrects the edge positions of the plurality of steel sheets 15 in this manner while sequentially allowing the plurality of steel sheets 15 after correction of the edge positions to pass through between the side guides 6a and 6b toward the edge aligning unit 8 in the subsequent stage.

After performing the aforementioned Step S101, the laminated core manufacturing device 1 arranges the edges of the plurality of laminated core materials whose edge positions have been corrected in Step S101 (Step S102). In Step S102, the edge aligning unit 8 receives, between the pair of side rollers 21a and 21b, the plurality of steel sheets 15 that has passed through between the side guides 6a and 6b of the edge position correction unit 6. The edge aligning unit 8 performs the edge aligning operation (see FIGS. 5 and 6) such as action of the elastic force of the spring 23 on each edge of the plurality of received steel sheets 15 from both right and left sides in the width direction D1, involving the pair of side rollers 21a and 21b. Accordingly, the edge aligning unit 8 aligns the edge positions of the plurality of steel sheets 15 in both sides in the width direction D1 between the steel sheets 15-1 to 15-n.

Next, the laminated core manufacturing device 1 prevents uplift of the plurality of laminated core materials whose edge positions have been aligned in Step S102 (Step S103). In Step S103, the uplift prevention unit 10 closes the upper side of the space (specifically, the interval between the pair of side rollers 21a and 21b) in the edge aligning unit 8 that allows the plurality of steel sheets 15 to pass therethrough. Accordingly, the uplift prevention unit 10 prevents uplift of the plurality of steel sheets 15 whose edge positions are pressed and aligned by the edge aligning unit 8 from both right and left sides in the width direction D1, particularly, uplift of each edge of the steel sheets 15-1 to 15-n. In regard to the plurality of steel sheets 15 whose edge positions have been aligned and prevented from being lifted in this manner by the uplift prevention unit 10 (hereinafter appropriately referred to as after the edge alignment), the edge aligning unit 8 allows the plurality of steel sheets 15 to sequentially pass therethrough toward the pinch roller 12 in the subsequent stage from between the pair of side rollers 21a and 21b.

After performing the aforementioned Step S103, the laminated core manufacturing device 1 forms the overlapped body 18 of the plurality of laminated core materials which has been subjected to each process in Steps S101 to S103 (Step S104).

In Step S104, the plurality of steel sheets 15 that has passed through the edge position correction unit 6 and the edge aligning unit 8 in this order from the feed roller group 5 as described above reaches the inlet of the pinch roller 12. In other words, the plurality of steel sheets 15 herein is a plurality of laminated core materials conveyed along different conveyance routes and subjected to the process to correct the edge positions in Step S101; the process to align the edge positions in Step S102; and the process to prevent uplift in Step S103. The pinch roller 12 sequentially receives the steel sheets 15-1 to 15-n of the plurality of steel sheets 15 as the laminated core materials, and sandwiches the received steel sheets 15-1 to 15-n in the thickness direction D3 so as to overlap the steel sheets 15-1 to 15-n while pressing the same. Accordingly, the pinch roller 12 obtains the overlapped body 18 of the plurality (n-pieces) of laminated core materials. The pinch roller 12 sequentially feeds the overlapped body 18 formed in this manner to the edge aligning unit 9 in the subsequent stage.

After performing the aforementioned Step S104, the laminated core manufacturing device 1 arranges the edges of the overlapped body 18 of the steel sheets 15-1 to 15-*n* formed in Step S104 (Step S105). In Step S105, the edge aligning unit 9 receives the overlapped body 18 fed from the pinch roller 12 between the pair of side rollers as similar to the case of the aforementioned edge aligning unit 8. The edge aligning unit 9 performs the edge aligning operation on each edge of the received overlapped body 18 as similar to the case of the aforementioned edge aligning unit 8. Accordingly, the edge aligning unit 9 aligns the edge positions on both sides in the width direction D1 of the overlapped body 18 (that is, the plurality of overlapped laminated core materials) between the steel sheets 15-1 to 15-*n* of the overlapped body 18.

Next, the laminated core manufacturing device 1 prevents uplift of the overlapped body 18 whose edge positions have been aligned in Step S105 (Step S106). In Step S106, the uplift prevention unit 11 closes the upper side of the space in the edge aligning unit 9 (specifically, the interval between the pair of side rollers) that allows, the overlapped body 18 to pass therethrough. Accordingly, the uplift prevention unit 11 prevents uplift of the overlapped body 18 whose edge positions are pressed and aligned by the edge aligning unit 9 from both right and left sides in the width direction D1, particularly, uplift of each edge of the steel sheets 15-1 to 15-*n*. In regard to the overlapped body 18 after the edge alignment which has been prevented from being lifted in this manner by the uplift prevention unit 11, the edge aligning unit 9 allows the overlapped body 18 to sequentially pass therethrough toward the edge position correction unit 7 in the subsequent stage from between the pair of side rollers.

After performing the aforementioned Step S106, the laminated core manufacturing device 1 corrects the edge positions of the overlapped body 18 of the plurality of laminated core materials (Step S107). In Step S107, the edge position correction unit 7 receives the overlapped body 18 fed from the edge aligning unit 9 between the side guides 7*a* and 7*b*. The edge position correction unit 7 corrects meandering in the width direction D1 of the received overlapped body 18, using the side guides 7*a* and 7*b*. Accordingly, the edge position correction unit 7 corrects the edge positions of the overlapped body 18, that is, each edge position of the overlapped steel sheets 15-1 to 15-*n*. Such correction reduces the amount of shift of the edge positions of the overlapped body 18 (the edge positions Pa and Pb illustrated in FIG. 2) from the standard edge positions SPa and SPb. The edge position correction unit 7 corrects the edge positions of the overlapped body 18 in this manner while sequentially allowing the overlapped body 18 after the edge position correction to pass through between the side guides 7*a* and 7*b* toward the dies (the upper die 13*a* and the lower die 13*b*) of the pressing machine 13.

After performing the aforementioned Step S107, the laminated core manufacturing device 1 punches out the overlapped body 18 which has been subjected to each process in Steps S105 to S107, so as to obtain a punched out body of the plurality of laminated core materials (Step S108).

In Step S108, the pressing machine 13 sequentially receives, between the upper die 13*a* and the lower die 13*b*, the overlapped body 18 that has passed through the edge aligning unit 9 and the edge position correction unit 7 in this order from the pinch roller 12 as described above. The overlapped body 18 herein is a plurality of laminated core materials overlapped in Step S104 and subjected to the process to align the edge positions in Step S105; the process to prevent uplift in Step S106; and the process to correct the edge positions in Step S107. The pressing machine 13 sandwiches such a overlapped body 18 between the upper die 13*a* and the lower die 13*b* so as to restrain the same. Next, the pressing machine 13 simultaneously punches out the restrained overlapped body 18 in the thickness direction D3, using the upper die 13*a* and the lower die 13*b*. Accordingly, the pressing machine 13 obtains the punched out body of the plurality of laminated core materials (specifically, the steel sheets 15-1 to 15-*n*) having the target core shape from the overlapped body 18. Every time the overlapped body 18 is received between the upper die 13*a* and the lower die 13*b* in this manner, the pressing machine 13 continuously performs the punching process on the received overlapped body 18. Thus, the pressing machine 13 obtains a plurality of punched bodies having the target core shape.

After, performing the aforementioned Step S108, the laminated core manufacturing device 1 laminates and integrates the plurality of punched bodies obtained in Step S108, so as to manufacture a desired laminated core (Step S109). In Step S109, the pressing machine 13 laminates the plurality of punched bodies obtained in Step S108 with the upper die 13*a* and the lower die 13*b* in such a manner that each rolling direction of the steel sheets 15-1 to 15-*n*, which are the materials, aligns in the same direction, and then, the pressing machine 13 integrates the plurality of laminated punched bodies with caulking and the like. Thus, the pressing machine 13 manufactures the laminated core having the target shape.

In this Step S109, the integration of the core-shaped punched bodies may be achieved as the pressing machine 13 forms dowels for caulking into punched bodies with its die (that is, a die including the upper die 13*a* and the lower die 13*b*, the same applies hereinafter) and presses these dowels with a predetermined device to caulk the punched bodies with each other. The integration of the core-shaped punched bodies may also be achieved by welding the punched bodies outside the die of the pressing machine 13, or by fixing the punched bodies to each other with a fixing unit such as a bolt or an adhesive.

In the laminated core manufacturing method according to the embodiment of the present invention, each process in the aforementioned Steps S101 to S109 is repetitively performed every time a laminated core is manufactured using the steel sheets 15-1 to 15-*n* as the laminated core materials.

In the aforementioned embodiment, the number of steel sheets to be overlapped and punched out as the laminated core materials is plural (two or more). From a viewpoint of increasing production efficiency of a laminated core, it should be noted that the number of steel sheets (laminated core materials) to be overlapped and punched out is preferably more than two (for example, three or more). However, an increase in the number of steel sheets to be overlapped increases an amount of shape deviation in the steel sheets after punching (that is, the punched out body of the overlapped laminated core materials) and an amount of droop in a punched surface. Therefore, the number of steel sheets to be overlapped is preferably two or more, and four or less.

In the aforementioned embodiment, the edge aligning units 8 and 9 are respectively installed at the position just before the inlet and the position just behind the outlet of the pinch roller 12, but the present invention is not limited thereto. The edge aligning unit in accordance with aspects of the present invention may be installed only at the position just before the inlet of the pinch roller 12, or may be installed only at the position just behind the outlet of the pinch roller 12.

Furthermore, in the aforementioned embodiment, the edge aligning units 8 and 9 are singularly installed at the position just before the inlet and the position just behind the outlet of the pinch roller 12, but the present invention is not limited thereto. In accordance with aspects of the present invention, the number of the edge aligning units to be installed may be one or more at each of the positions just before the inlet and just behind the outlet of the pinch roller 12. Alternatively, the number of installations may be one or more at the position just before the inlet of the pinch roller 12, or may be one or more at the position just behind the outlet of the pinch roller 12.

In the aforementioned embodiment, the edge position correction unit 6 is installed at the position just before the inlet of the edge aligning unit 8 in the preceding stage of the pinch roller 12, and the edge position correction unit 7 is installed at the position just behind the outlet of the edge aligning unit 9 in the subsequent stage of the pinch roller 12, but the present invention is not limited thereto. In accordance with aspects of the present invention, the edge position correction unit 6 may be installed at the position just behind the outlet of the edge aligning unit 8 in the preceding stage of the pinch roller 12, and the edge position correction unit 7 may be installed at the position just before the inlet of the edge aligning unit 9 in the subsequent stage of the pinch roller 12. The edge position correction unit 7 may also be installed outside the pressing machine 13, but in the preceding stage of the same.

Furthermore, in the aforementioned embodiment, the edge position correction units 6 and 7 are singularly installed in the preceding stage and the subsequent stage of the pinch roller 12, but the present invention is not limited thereto. In accordance with aspects of the present invention, the number of the edge position correction units to be installed may be one or more in each of the preceding stage and the subsequent stage of the pinch roller 12. Alternatively, the number of installations may be one or more in the preceding stage of the pinch roller 12, or may be one or more in the subsequent stage of the pinch roller 12.

In the aforementioned embodiment, the plurality of laminated core materials is overlapped by the feed roller group 5 positioned in the preceding stage of the pinch roller 12, that is, a plurality of horizontally arranged feed rollers (for example, five feed rollers 5a to 5e), but the present invention is not limited thereto. In accordance with aspects of the present invention, instead of the feed roller group 5, a flat stage may be provided, and the plurality of laminated core materials may be overlapped on this stage. Alternatively, without providing any overlapping unit such as the feed roller group 5 and the flat stage in the preceding stage of the pinch roller 12, the plurality of laminated core materials may be overlapped by the pinch roller 12 for the first time.

Furthermore, in the aforementioned embodiment, each conveyance route of the steel sheets 15-1 to 15-n is provided with two feed rollers, but the present invention is not limited thereto. In accordance with aspects of the present invention, the number of feed rollers to be installed for each conveyance route of the steel sheets 15-1 to 15-n may be one or more as long as each conveyance route is provided with a sufficient number of feed rollers for conveying the steel sheets 15-1 to 15-n.

In the aforementioned embodiment, the electrical steel sheet is exemplified as the laminated core material, but the present invention is not limited thereto. The steel sheet as the laminated core material according to aspects of the present invention is not limited to the electrical steel sheet, but may be a steel sheet other than the electrical steel sheet, or an iron alloy sheet other than the steel sheet.

Furthermore, in the aforementioned embodiment, such an example is described that the pressing machine 13 (punching unit) is configured to perform operations from punching to laminated core manufacturing, where the punching operation is to punch out the overlapped body 18 of the plurality of steel sheets 15 so as to manufacture the plurality of core-shaped punched bodies, and the laminated core manufacturing operation is to integrate the plurality of obtained punched bodies so as to manufacture a laminated core, but the present invention is not limited to thereto. In accordance with aspects of the present invention, the pressing machine 13 may perform the punching operation, and then, may not perform the laminated core manufacturing operation.

In other words, the laminated core manufacturing device and the laminated core manufacturing method according to aspects of the present invention are provided to manufacture at least a punched out body of a plurality of laminated core materials used for manufacturing a laminated core. Therefore, the punching unit may perform operations from punching to laminated core manufacturing, where the punching process is to punch out the plurality of overlapped laminated core materials, and the laminated core manufacturing operation is to integrate a plurality of punched bodies so as to manufacture a laminated core. Alternatively, the punching unit may perform the punching operation to punch out a plurality of overlapped laminated core materials, so as to manufacture a punched out body of the plurality of laminated core materials (a core-shaped punched out body of the plurality of laminated core materials) used for manufacturing a laminated core. In regard to the punched out body of the plurality of laminated core materials manufactured by the laminated core manufacturing device and the laminated core manufacturing method according to aspects of the present invention, a plurality of punched bodies may be laminated and integrated in another operation (another manufacturing line) with a device disposed outside the die of the punching unit, so as to manufacture a laminated core.

Example 1

Hereinafter, Example 1 of the present invention will be described. Example 1 was performed to study the necessity of edge alignment (to align edge positions, the same applies hereinafter) and edge position correction with respect to a plurality of laminated core materials. In Example 1, a punching test was performed as Invention Example 1, using the laminated core manufacturing device 1 according to the embodiment of the present invention (see FIGS. 1 and 2). In the punching test, a plurality of laminated core materials was overlapped and was simultaneously punched out.

As a condition of Invention Example 1, the number of laminated core materials to be overlapped was designed to be 2. In other words, steel sheets 15-1 and 15-2 as laminated core materials were respectively fed to the discharging units 2-1 and 2-2 of the laminated core manufacturing device 1. Both of these steel sheets 15-1 and 15-2 were non-oriented electrical steel sheets wound in a coil shape, having a sheet thickness of 0.20 mm and a sheet width of 250 mm.

In Invention Example 1, the laminated core manufacturing device 1 repetitively performed each process in Steps S101 to S109 illustrated in FIG. 7 with respect to the steel sheet 15-1 discharged from the discharging unit 2-1 and the steel sheet 15-2 discharged from the discharging unit 2-2, and then continuously punched out these two overlapped steel sheets 15-1 and 15-2. Herein, just before the first punching, edge positions on the right and left sides in the width direction D1 of the top-and-bottom steel sheets 15-1 and 15-2 were adjusted so as to correspond to each other. Intervals between the edge positions of these steel sheets 15-1 and 15-2 and the side guides 7a and 7b (see FIG. 2) of the edge position correction unit 7 were adjusted to be equal at both right and left edges. A reference interval $W_{bas}$ between the pair of side rollers in each of the edge aligning units 8 and 9 was made to correspond to the sheet width W of the steel sheets 15-1 and 15-2. An initial interval between each of the side guides 6a, 6b, 7a, and 7b of the edge position correction unit 6 and 7 (see FIG. 2) and each edge position of the steel sheets 15-1 and 15-2 was set to 2 mm. A stroke rate at which the pressing machine 13 punched out a core-shaped punched out body from a overlapped body 18 of the steel sheets 15-1 and 15-2 was set to 200 spm (stroke/min), and the pressing machine 13 continuously performed the punching process up to 200th stroke at the aforementioned stroke rate.

In Example 1, Comparative Examples 1 and 2 were performed to compare with the Invention Example 1. In Comparative Example 1, after performing the punching process of Invention Example 1, a device corresponding to the laminated core manufacturing device 1 used in Invention Example 1 with the edge aligning units 8 and 9 being removed therefrom (hereinafter referred to as the laminated core manufacturing device of Comparative Example 1) was prepared, and the laminated core manufacturing device of Comparative Example 1 continuously performed the punching process of the steel sheets 15-1 and 15-2. In Comparative Example 2, after performing the punching process of Comparative Example 1, a device corresponding to the laminated core manufacturing device of Comparative Example 1 with the edge position correction units 6 and 7 being removed therefrom (hereinafter referred to as the laminated core manufacturing device of Comparative Example 2) was prepared, and the laminated core manufacturing device of Comparative Example 2 continuously performed the punching process of the steel sheets 15-1 and 15-2.

Conditions in Comparative Example 1 were similar to those in Invention Example 1 except that the edge alignment of the steel sheets 15-1 and 15-2 was not performed. Conditions in Comparative Example 2 were similar to those in Invention Example 1 except that the edge alignment and the edge position correction of the steel sheets 15-1 and 15-2 were not performed.

In Example 1, for each of Invention Example 1 and Comparative Examples 1 and 2, the number of strokes by which the continuous punching process of the two overlapped steel sheets 15-1 and 15-2 could not be performed any more (hereinafter referred to as the number of continuous punching strokes), and the state of the edge positions of the steel sheets 15-1 and 15-2 after the punching test were measured so as to evaluate continuous punchability of the laminated core materials based on the obtained measurement results.

Table 1 illustrates results of evaluating the continuous punchability of the laminated core materials for each of Invention Example 1, and Comparative Examples 1 and 2.

TABLE 1

|  | Number of continuous punching strokes | Edge position |
|---|---|---|
| Invention example 1 | 200 Strokes or more | Be in contact with side guide on one side |
| Comparative example 1 | 30 Strokes | Be in contact with side guides on both sides |
| Comparative example 2 | 50 Strokes | Being shifted from die |

As illustrated in Table 1, the number of continuous punching strokes of the Invention Example 1 was 200 strokes or more. In other words, in Invention Example 1, the punching process of the steel sheets 15-1 and 15-2 was performed continuously up to 200th stroke without any particular trouble. After completion of the punching test of Invention Example 1, the steel sheets 15-1 and 15-2 were in contact with one side guide (for example, one of the side guides 7a and 7b of the edge position correction unit 7 illustrated in FIG. 2). This result shows that, in Invention Example 1, each edge position of the steel sheets 15-1 and 15-2 could be maintained in a state of alignment while the punching process of the steel sheets 15-1 and 15-2 was performed continuously up to 200th stroke.

Compared with the aforementioned Invention Example 1, the number of continuous punching strokes of Comparative Example 1 was 30 strokes as illustrated in Table 1. In other words, in Comparative Example 1, the steel sheets 15-1 and 15-2 were gradually lifted during the punching process of the steel sheets 15-1 and 15-2. Such uplift caused the steel sheets 15-1 and 15-2 to clog the die of the pressing machine 13 at the time of 30th stroke, which disabled the punching process of the steel sheets 15-1 and 15-2. After completion of the punching test of Comparative Example 1 (on completing the punching process for 30 strokes), the steel sheets 15-1 and 15-2 were in contact with both side guides (for example, both of the side guides 7a and 7b of the edge position correction unit 7 illustrated in FIG. 2). This result shows that, in Comparative Example 1, each edge position of the steel sheets 15-1 and 15-2 widely shifted in the width direction D1 by the time the punching process of the steel sheets 15-1 and 15-2 was performed for 30 strokes.

Furthermore, the number of continuous punching strokes of Comparative Example 2 was 50 strokes as illustrated in Table 1, and each edge position of the steel sheets 15-1 and 15-2 after punching for 50 strokes shifted from the die of the pressing machine 13. In other words, in Comparative Example 2, the steel sheets 15-1 and 15-2 gradually shifted in the width direction D1 during the punching process of the steel sheets 15-1 and 15-2. Such shift caused the edge positions of the steel sheets 15-1 and 15-2 to shift from the die of the pressing machine 13 at the time of 50th stroke so that the steel sheets 15-1 and 15-2 were partially chipped off.

Based on comparison of the results of Invention Example 1 and Comparative Examples 1 and 2 as described above, it is clear that performing the edge alignment and the edge position correction on a plurality of overlapped laminated core materials is indispensable when continuously and simultaneously punching out the plurality of laminated core materials.

Example 2

Hereinafter, Example 2 of the present invention will be described. Example 2 was performed to study a preferable installation position of an edge aligning unit in a laminated core manufacturing device. In Example 2, the punching test of Invention Example 1 was performed with the laminated core manufacturing device 1 according to the embodiment of the present invention under conditions substantially similar to those in the aforementioned Example 1.

In other words, in Invention Example 1 in Example 2, a reference interval $W_{bas}$ between the pair of side rollers in each of the edge aligning units 8 and 9 was set to 245 mm (<a sheet width W=250 mm), and a gap T (see FIG. 4) between the upper surfaces of the side roller stages in each of the edge aligning units 8 and 9 and each of the uplift prevention units 10 and 11 was set to 2 mm. The pressing machine 13 punched out a core-shaped punched out body from a overlapped body 18 of steel sheets 15-1 and 15-2 for consecutive 2000 strokes at a stroke rate of 200 spm (stroke/min). Other conditions were similar to those of Invention Example 1 in the aforementioned Example 1.

In Example 2, Invention Examples 2 and 3 were performed to compare with Invention Example 1. In Invention Example 2, after performing the punching process of Invention Example 1, a device corresponding to the laminated core manufacturing device 1 used in Invention Example 1 with the edge aligning unit 9 being removed therefrom (hereinafter referred to as the laminated core manufacturing device of Invention Example 2) was prepared, and the laminated core manufacturing device of Invention Example 2 continuously performed the punching process of the steel sheets 15-1 and 15-2. In Invention Example 3, after performing the punching process of Invention Example 2, a device corresponding to the laminated core manufacturing device of Invention Example 2 with the edge aligning unit 8 being removed therefrom and the edge aligning unit 9 being attached thereto (hereinafter referred to as the laminated core manufacturing device of Invention Example 3) was prepared, and the laminated core manufacturing device of Invention Example 3 continuously performed the punching process of the steel sheets 15-1 and 15-2. This laminated core manufacturing device of Invention Example 3 corresponds to the laminated core manufacturing device 1 (see FIGS. 1 and 2) of Invention Example 1 with the edge aligning unit 8 being removed therefrom.

Conditions in Invention Example 2 were similar to those in Invention Example 1 of Example 2 except that the edge alignment of the steel sheets 15-1 and 15-2 was not performed at the position just behind the outlet of the pinch roller 12. Conditions in Invention Example 3 were similar to those in Invention Example 1 of Example 2 except that the edge alignment of the steel sheets 15-1 and 15-2 was not performed at the position just before the inlet of the pinch roller 12.

In Example 2, for each of Invention Examples 1 to 3, on completing the punching process of two overlapped steel sheets 15-1 and 15-2 for consecutive 2000 strokes at the aforementioned stroke rate, the following amounts were measured: an amount of shift of edge positions between the steel sheets 15-1 and 15-2 positioned just before the pressing machine 13 (that is, an amount of shift $\Delta W$ of the edge positions); and an amount of uplift $\Delta h$ of the steel sheets 15-1 and 15-2 from the lower die 13b of the pressing machine 13. Based on the obtained measurement results, the degree of the amount of shift $\Delta W$ of the edge positions and the amount of uplift $\Delta h$ due to a difference in installation positions of the edge aligning units 8 and 9 were evaluated.

Figure 8:
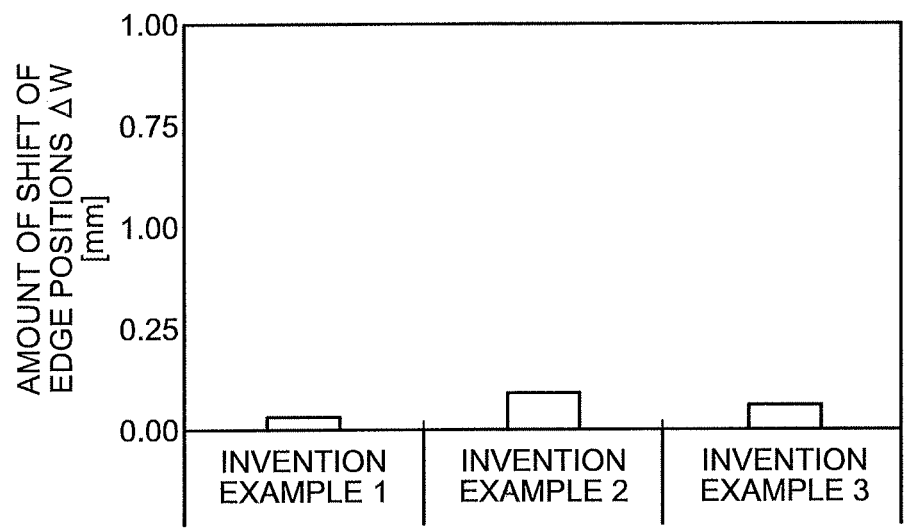
FIG. 8 is a view illustrating evaluation results in Example 2 of the present invention regarding an amount of shift of edge positions of punched steel sheets that are positioned just before a die.
Figure 9:
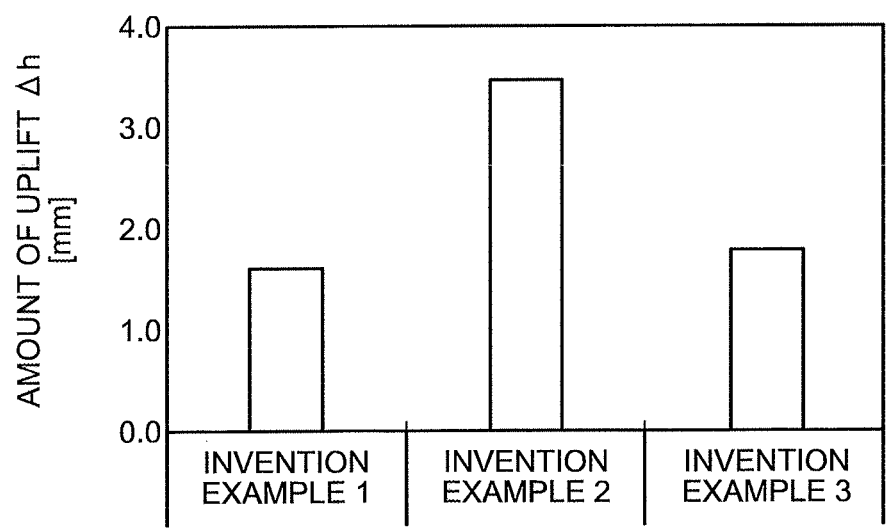
FIG. 9 is a view illustrating evaluation results in Example 2 of the present invention regarding an amount of uplift of the punched steel sheets from a lower die.

FIG. 8 is a view illustrating the evaluation results in Example 2 of the present invention regarding the amount of shift of the edge positions of the punched steel sheets that are positioned just before the die. FIG. 9 is a view illustrating the evaluation results in Example 2 of the present invention regarding the amount of uplift of the punched steel sheets from the lower die. As illustrated in FIGS. 8 and 9, in each of Invention Examples 1 to 3, the amount of shift $\Delta W$ of the edge positions of the steel sheets 15-1 and 15-2 and the amount of uplift $\Delta h$ of the steel sheets 15-1 and 15-2 from the lower die 13b were small, causing no trouble to disable the punching process. In particular, as illustrated in FIGS. 8 and 9, comparing Invention Examples 1 to 3 in regard to the amount of shift $\Delta W$ of the edge positions and the amount of uplift $\Delta h$, both of the amounts were found to be smaller in Invention Examples 1 and 3 than in Invention Example 2. This result shows that it is preferable to install the edge aligning unit in the laminated core manufacturing device at the position after overlapping the plurality of laminated core materials (by the pinch roller 12 and the like).

Furthermore, as illustrated in FIGS. 8 and 9, both of the amounts in Invention Example 1 were smaller than those in Invention Example 3. This result shows that it is preferable to install the edge aligning units in the laminated core manufacturing device at both positions just before the inlet and just behind the outlet of the pinch roller 12 that overlaps the plurality of laminated core materials.

Example 3

Hereinafter, Example 3 of the present invention will be described. Example 3 was performed to verify an uplift-prevention effect of laminated core materials by the uplift prevention units 10 and 11 of the laminated core manufacturing device 1. In Example 3, the punching test of Invention Example 1 was performed with the laminated core manufacturing device 1 according to the embodiment of the present invention under conditions substantially similar to those in the aforementioned Example 1.

In other words, in Invention Example 1 of Example 3, a gap T (see FIG. 4) between the upper surfaces of the side roller stages in each of the edge aligning units 8 and 9 and each of the uplift prevention units 10 and 11 was set to 2 mm. The pressing machine 13 punched out a core-shaped punched out body from a overlapped body 18 of steel sheets 15-1 and 15-2 for consecutive 2000 strokes at a stroke rate of 200 spm (stroke/min). Other conditions were similar to those of Invention Example 1 in the aforementioned Example 1.

In Example 3, Comparative Example 3 was performed to compare with Invention Example 1. In Comparative Example 3, after performing the punching process of Invention Example 1, a device corresponding to the laminated core manufacturing device 1 used in Invention Example 1 with the uplift prevention units 10 and 11 being removed therefrom (hereinafter referred to as the laminated core manufacturing device of Comparative Example 3) was prepared, and the laminated core manufacturing device of Comparative Example 3 continuously performed the punching process of the steel sheets 15-1 and 15-2. Conditions in Comparative Example 3 were similar to those in Invention Example 1 of Example 3 except that the uplift prevention of the steel sheets 15-1 and 15-2 by the uplift prevention units 10 and 11 was not performed.

In Example 3, for each of Invention Example 1 and Comparative Example 3, measured was the number of continuous punching strokes by which the continuous punching process of the two overlapped steel sheets 15-1 and 15-2 could not be performed any more. Based on the obtained measurement result, evaluated was continuous punchability depending on a difference between a case of providing the uplift prevention units 10 and 11 and a case of not providing the same.

As a result of the evaluation, it was found that, in Invention Example 1, the punching process of the steel sheets 15-1 and 15-2 could be performed for consecutive 2000 strokes or more. On the other hand, in Comparative Example 3, edges of the steel sheets 15-1 and 15-2 were gradually lifted during the continuous punching process of the steel sheets 15-1 and 15-2. Such uplift caused the steel sheets 15-1 and 15-2 to clog the die of the pressing machine 13 by the time when the punching process was performed for 500 to 550 strokes, which disabled the punching process of the steel sheets 15-1 and 15-2. This result shows that installing the uplift prevention units 10 and 11 respectively on the upper parts of the edge aligning units 8 and 9 makes it possible to prevent uplift of the laminated core materials during the punching process, which improves the continuous punchability of the overlapped body of the laminated core materials.

Example 4

Hereinafter, Example 4 of the present invention will be described. Example 4 was performed to verify an effect of a rail (for example, the rail 25a illustrated in FIG. 3) that moves a pair of side roller stages in an edge aligning unit (for example, the pair of side roller stages 22a and 22b illustrated in FIGS. 3 and 4) in the width direction D1. In Example 4, the punching test of Invention Example 1 was performed with the laminated core manufacturing device 1 according to the embodiment of the present invention under conditions similar to those in the aforementioned Example 3.

In Example 4, Invention Example 4 was performed to compare with Invention Example 1. In Invention Example 4, after performing the punching process of Invention Example 1, a device corresponding to the laminated core manufacturing device 1 used in Invention Example 1 with the side roller stages in the edge aligning units 8 and 9 being fixed on the rail (hereinafter referred to as the laminated core manufacturing device of Invention Example 4) was prepared, and the laminated core manufacturing device of Invention Example 4 continuously performed the punching process of the steel sheets 15-1 and 15-2. Conditions in Invention Example 4 were similar to those in Invention Example 1 of Example 4 except that each side roller stage of the edge aligning units 8 and 9 was fixed on the rail (each side roller stage was made immovable).

In Example 4, for each of Invention Examples 1 and 4, on completing the punching process of two overlapped steel sheets 15-1 and 15-2 for consecutive 2000 strokes at the aforementioned stroke rate, an amount of uplift Δh of the steel sheets 15-1 and 15-2 from the lower die 13b of the pressing machine 13 was measured. Based on the obtained measurement result, evaluated was the degree of the amount of uplift Δh depending on a difference between a case where each side roller stage of the edge aligning units 8 and 9 was movable in the width direction D1 and a case where the same was not movable.

Figure 10:
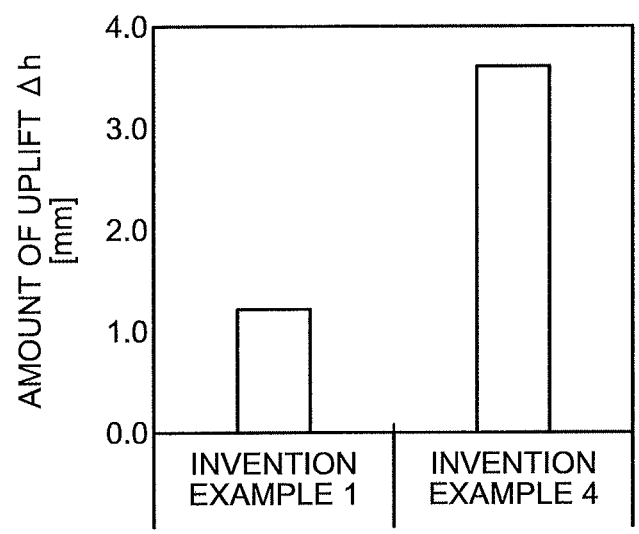
FIG. 10 is a view illustrating evaluation results in Example 4 of the present invention regarding an amount of uplift of punched steel sheets from a lower die.

FIG. 10 is a view illustrating evaluation results in Example 4 of the present invention regarding the amount of uplift of the punched steel sheets from the lower die. In any of Invention Examples 1 and 4, the punching process of the steel sheets 15-1 and 15-2 could be performed continuously up to 2000th stroke, but as illustrated in FIG. 10, the amount of uplift Δh in Invention Example 4 was larger than that in Invention Example 1. This result shows that providing the side roller stages (for example, the pair of side roller stages 22a and 22b illustrated in FIGS. 3 and 4) in the edge aligning units 8 and 9 freely and movably along the rail extending in the width direction D1 (for example, the rail 25a illustrated in FIG. 3) efficiently reduces the amount of uplift Δh.

As described above, according to aspects of the present invention, a punched out body of a plurality of laminated core materials used for manufacturing a laminated core is at least manufactured in at least one of the preceding stage and the subsequent stage of the overlapping unit configured to overlap the plurality of laminated core materials conveyed along different conveyance routes by performing the following processes: the edge aligning process to align edge positions of the plurality of laminated core materials between the laminated core materials; the uplift prevention process to prevent uplift of the plurality of laminated core materials whose edge positions are aligned by the edge aligning process; and the edge position correction process to correct the edge positions of the plurality of laminated core materials, and an overlapped body of the plurality of laminated core materials subjected to the edge aligning process, the uplift prevention process, and the edge position correction process is simultaneously punched out into a target core shape.

Therefore, without detecting each edge position of the plurality of laminated core materials with a detection device, it is possible to correct the edge positions of the plurality of laminated core materials to positions suitable for feeding the laminated core materials into the die of the pressing machine with a simple device structure, and it is possible to align the edge positions between the laminated core materials, what is more, it is possible to prevent uplift of each laminated core material. Accordingly, it is possible to suppress, to the extent possible, shift of the edge positions and uplift of the plurality of laminated core materials overlapped and punched out to manufacture a laminated core, while maintaining each edge position in a state of alignment between the laminated core materials. Thus, it is possible to stably supply the overlapped body of the plurality of laminated core materials, whose edge positions are aligned between the laminated core materials, into a punching operation to manufacture a laminated core, while reducing installation costs and running costs of devices and reducing time and effort required for maintenance of the devices.

According to aspects of the present invention, it is possible to stably and sequentially feed the overlapped body of the plurality of laminated core materials into the die of the punching unit (pressing machine), while maintaining the edge positions in a state of alignment between the laminated core materials. Thus, it is possible to prevent troubles due to shift in the width direction of the laminated core materials such as contact between the die and the overlapped body, and troubles such as clogging due to uplift of the laminated core materials inside the die, and it is possible to stably manufacture a desired laminated core by continuously punching out a punched out body. When simultaneously punching out the overlapped body of the plurality of laminated core materials, it is possible to suppress shift of the edge positions between the laminated core materials forming the overlapped body, which makes it possible to prevent troubles of the punching process attributed to the shift in the edge positions between the laminated core materials, thereby improving the production efficiency of manufacturing a laminated core. Furthermore, it is possible to manufacture a laminated core using a thinner laminated core material (for example, a thin electrical steel sheet) with high production efficiency, thereby providing an excellent laminated core with low energy loss.

Still further, in accordance with aspects of the present invention, the edge aligning unit is installed just behind the overlapping unit that overlaps the plurality of laminated core materials, or plurally installed just before the inlet and just behind the outlet of the overlapping unit so as to align the edge positions of the plurality of laminated core materials between the laminated core materials. This makes it possible to further reduce the amount of shift of each edge position of the overlapped laminated core materials at the position just before the die of the pressing machine, and it is possible to further reduce the amount of uplift of each laminated core material inside the die. Thus, it is possible to feed the overlapped body of the plurality of laminated core materials into the die of the pressing machine with more stability.

Still further, in accordance with aspects of the present invention, the pair of side roller stages in the edge aligning unit is configured to be movable along the rail extending in the width direction of the plurality of laminated core materials. Therefore, the center position between the pair of side roller stages can be freely moved in accordance with the balance of the force acting on the pair of side rollers of the edge aligning unit from each laminated core material. This makes it possible to evenly act the pressing force (the elastic force of the spring) on each edge on both sides in the width direction of the plurality of laminated core materials from the pair of side rollers on the pair of side roller stages. Thus, it is possible to align the edge positions of the plurality of laminated core materials between the laminated core materials, while preventing uplift of the plurality of laminated core materials.

It should be noted that the present invention is not limited to the aforementioned embodiment and Examples. Structures with appropriate combinations of the aforementioned components are also incorporated in aspects of the present invention. The shape and uses of the laminated core manufactured in accordance with aspects of the present invention are not particularly limited. Other embodiments, Examples, operation techniques, and the like that are to be performed by those skilled in the art based on the aforementioned embodiment and Examples are all included in the scope of the present invention.

INDUSTRIAL APPLICABILITY

In such manners, a laminated core manufacturing device and a laminated core manufacturing method according to an embodiment of the present invention are useful for manufacturing a laminated core by punching out a plurality of overlapped laminated core materials, and particularly, suitable for a laminated core manufacturing device and a laminated core manufacturing method capable of suppressing, to the extent possible, shift of edge positions and uplift of the plurality of laminated core materials overlapped and punched out to manufacture a laminated core.

REFERENCE SIGNS LIST

1 LAMINATED CORE MANUFACTURING DEVICE
2-1 to 2-$n$ DISCHARGING UNIT
3-1 to 3-$n$, 4-1 to 4-$n$, 5$a$ to 5$e$ FEED ROLLER
5 FEED ROLLER GROUP
6, 7 EDGE POSITION CORRECTION UNIT
6$a$, 6$b$, 7$a$, 7$b$ SIDE GUIDE
8, 9 EDGE ALIGNING UNIT
10, 11 UPLIFT PREVENTION UNIT
12 PINCH ROLLER
13 PRESSING MACHINE
13$a$ UPPER DIE
13$b$ LOWER DIE
15 PLURALITY OF STEEL SHEETS
15-1 to 15-$n$ STEEL SHEET
18 OVERLAPPED BODY
21$a$, 21$b$ SIDE ROLLER
22$a$, 22$b$ SIDE ROLLER STAGE
23 SPRING
24$a$, 24$b$ WHEEL
25 BASEMENT
25$a$ RAIL
D1 WIDTH DIRECTION
D2 LONGITUDINAL DIRECTION
D3 THICKNESS DIRECTION
Pa, Pb EDGE POSITION
SPa, SPb STANDARD EDGE POSITION

The invention claimed is:

1. A laminated core manufacturing apparatus for manufacturing at least a punched out body of a plurality of laminated core materials used for manufacturing a laminated core, the laminated core manufacturing apparatus comprising:
an overlapping unit configured to overlap the plurality of laminated core materials conveyed along different conveyance routes;
an edge aligning unit configured to align edge positions in a width direction of the plurality of laminated core materials between the plurality of laminated core materials;
an uplift prevention unit configured to prevent uplift of the plurality of laminated core materials whose edge positions are aligned by the edge aligning unit;
an edge position correction unit configured to correct the edge positions in the width direction of the plurality of laminated core materials; and
a punching unit configured to punch out the plurality of laminated core materials which are overlapped by the overlapping unit and have been subjected to an edge position alignment process performed by the edge aligning unit, an uplift prevention process performed by the uplift prevention unit, and an edge position correction process performed by the edge position correction unit, so as to obtain the punched out body,
wherein the edge aligning unit includes:
a pair of side rollers facing each other in the width direction of the plurality of laminated core materials; and
a spring configured to generate elastic force to bias the pair of side rollers in a facing direction,
wherein the elastic force of the spring increases or decreases in accordance with a difference between a maximum edge-to-edge distance and a reference interval when the maximum edge-to-edge distance, which is a distance between farthest edges in the width direction of the plurality of laminated core materials, exceeds the reference interval between the pair of side rollers, and
wherein the pair of side rollers sandwiches the plurality of laminated core materials in the width direction by the elastic force of the spring so as to align the edge positions.

2. The laminated core manufacturing apparatus according to claim 1, wherein the edge aligning unit is installed just before an inlet of the overlapping unit or just behind an outlet of the overlapping unit.

3. The laminated core manufacturing device apparatus according to claim 2, further comprising an additional edge aligning unit configured to align edge positions in a width direction of the plurality of laminated core materials between the plurality of laminated core materials, wherein
when the edge aligning unit is installed just before the inlet of the overlapping unit, the additional edge aligning unit is installed just behind the outlet of the overlapping unit; and
when the edge aligning unit is installed just behind the outlet of the overlapping unit, the additional edge aligning unit is installed just before the inlet of the overlapping unit.

4. The laminated core manufacturing apparatus according to claim 1, wherein the edge aligning unit is provided with the pair of side rollers and includes a pair of side roller stages movable in the width direction of the plurality of laminated core materials.

5. The laminated core manufacturing apparatus according to claim 1, wherein the uplift prevention unit is installed on an upper part of the edge aligning unit so as to close an upper side of the edge aligning unit.

6. A laminated core manufacturing method for manufacturing at least a punched out body of a plurality of laminated core materials used for manufacturing a laminated core, the laminated core manufacturing method comprising:
an overlapping step of overlapping the plurality of laminated core materials conveyed along different conveyance routes;
an edge aligning step of aligning with an edge aligning unit edge positions in a width direction of the plurality of laminated core materials between the plurality of laminated core materials;
an uplift prevention step of preventing uplift of the plurality of laminated core materials whose edge positions are aligned in the edge aligning step;
an edge position correction step of correcting the edge positions in the width direction of the plurality of laminated core materials; and
a punching step of punching out the plurality of laminated core materials which have been overlapped in the overlapping step, and subjected to an edge position alignment process in the edge aligning step, an uplift prevention process in the uplift prevention step, and an edge position correction process in the edge position correction step, so as to obtain the punched out body,
wherein the edge aligning unit includes:
a pair of side rollers facing each other in the width direction of the plurality of laminated core materials; and
a spring configured to generate elastic force to bias the pair of side rollers in a facing direction,
wherein in the edge aligning step, the elastic force of the spring increases or decreases in accordance with a difference between a maximum edge-to-edge distance and a reference interval when the maximum edge-to-edge distance, which is a distance between farthest edges in the width direction of the plurality of laminated core materials, exceeds the reference interval between the pair of side rollers, and
wherein in the edge aligning step, the pair of side rollers sandwiches the plurality of laminated core materials in the width direction by the elastic force of the spring so as to align the edge positions.

\* \* \* \* \*